US009769229B2

(12) United States Patent
Morotomi et al.

(10) Patent No.: US 9,769,229 B2
(45) Date of Patent: Sep. 19, 2017

(54) INFORMATION PROCESSING APPARATUS, INFORMATION PROCESSING METHOD AND PROGRAM

(71) Applicant: Sony Corporation, Tokyo (JP)

(72) Inventors: Shiro Morotomi, Kanagawa (JP); Hiroyuki Kawahara, Tokyo (JP); Kissei Matsumoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 417 days.

(21) Appl. No.: 13/788,222

(22) Filed: Mar. 7, 2013

(65) Prior Publication Data

US 2013/0185637 A1 Jul. 18, 2013

Related U.S. Application Data

(63) Continuation of application No. 11/769,371, filed on Jun. 27, 2007, now Pat. No. 8,416,184.

(30) Foreign Application Priority Data

Jun. 30, 2006 (JP) .................................. 2006-181915

(51) Int. Cl.
*G06F 3/00* (2006.01)
*H04L 29/06* (2006.01)
(Continued)

(52) U.S. Cl.
CPC ............ *H04L 65/60* (2013.01); *G06F 1/1624* (2013.01); *G06F 1/1671* (2013.01);
(Continued)

(58) Field of Classification Search
CPC ........ G06F 17/30053; G06F 17/30058; G10H 1/0025; G10H 2240/145; G10H 2240/061; G10H 2240/165; G10H 2230/015
(Continued)

(56) References Cited

U.S. PATENT DOCUMENTS 6,839,896 B2  1/2005 Coffman et al.
7,054,914 B2 * 5/2006 Suzuki et al. ................ 709/217
(Continued)

FOREIGN PATENT DOCUMENTS

JP  2004-304311  10/2004
JP  2005-057315   3/2005
(Continued)

OTHER PUBLICATIONS

Michael McCandless; The MP3 resolution; Date of Publication 1999; IEEE; 1 page.*
(Continued)

*Primary Examiner* — Linh K Pham
(74) *Attorney, Agent, or Firm* — Paratus Law Group, PLLC

(57) ABSTRACT

An information processing apparatus capable of simultaneously executing a reproduction function of content data and a communication function with an external apparatus includes a reproduction section configured to execute the reproduction function, a communication control section configured to execute the communication function using a communication section, an operation input allocation section configured to allocate an operation input from a first operation section to the reproduction function or the communication function, an operation input acquisition section configured to acquire an operation input from a second operation section, and a display control section configured to cause a display section to display information relating to the reproduction function or information relating to the communication function.

15 Claims, 41 Drawing Sheets

(51) Int. Cl.

| | | |
|---|---|---|
| *G06F 1/16* | (2006.01) | |
| *G06F 3/0481* | (2013.01) | |
| *G06F 9/44* | (2006.01) | |
| *H04M 1/725* | (2006.01) | |
| *G06F 3/16* | (2006.01) | |
| *H04M 1/02* | (2006.01) | |
| *H04M 1/253* | (2006.01) | |

(52) U.S. Cl.
CPC .......... *G06F 1/1688* (2013.01); *G06F 1/1698* (2013.01); *G06F 3/0481* (2013.01); *G06F 3/165* (2013.01); *G06F 9/4443* (2013.01); *H04M 1/72522* (2013.01); *H04M 1/0235* (2013.01); *H04M 1/2535* (2013.01); *H04M 1/7253* (2013.01); *H04M 1/72552* (2013.01); *H04M 1/72558* (2013.01); *H04M 1/72561* (2013.01)

(58) Field of Classification Search
USPC .......................................................... 715/716
See application file for complete search history.

(56) References Cited

U.S. PATENT DOCUMENTS

| | | | | |
|---|---|---|---|---|
| 8,065,706 | B2* | 11/2011 | Yeh ................. | 725/75 |
| 8,126,395 | B2* | 2/2012 | Balgard et al. ............. | 455/41.2 |
| 8,689,142 | B2* | 4/2014 | Pugsley et al. .............. | 715/835 |
| 2001/0025302 | A1* | 9/2001 | Suzuki et al. ............... | 709/217 |
| 2002/0037754 | A1 | 3/2002 | Hama et al. | |
| 2003/0005174 | A1 | 1/2003 | Coffman et al. | |
| 2003/0105835 | A1* | 6/2003 | Hori ................... | H04L 63/0428 709/219 |
| 2003/0131715 | A1* | 7/2003 | Georges .............. | G10H 1/0025 84/609 |
| 2004/0192401 | A1 | 9/2004 | Kaida | |
| 2005/0198570 | A1 | 9/2005 | Otsuka et al. | |
| 2006/0008256 | A1* | 1/2006 | Khedouri et al. ............ | 386/124 |
| 2006/0128305 | A1* | 6/2006 | Delalat ........................ | 455/41.2 |
| 2006/0184583 | A1 | 8/2006 | Renton et al. | |
| 2006/0195789 | A1* | 8/2006 | Rogers et al. ................ | 715/727 |
| 2006/0242676 | A1* | 10/2006 | Hoshino .................. | H04N 7/24 725/105 |
| 2007/0174482 | A1* | 7/2007 | Yajima .................. | G06F 17/246 709/238 |
| 2007/0276862 | A1 | 11/2007 | Toutonghi | |
| 2008/0139116 | A1* | 6/2008 | Balgard et al. .............. | 455/41.2 |
| 2009/0144642 | A1* | 6/2009 | Crystal ........................ | 715/764 |
| 2009/0307629 | A1* | 12/2009 | Horiuchi et al. .............. | 715/810 |
| 2010/0235792 | A1* | 9/2010 | Brodersen et al. ........... | 715/828 |

FOREIGN PATENT DOCUMENTS

| | | |
|---|---|---|
| JP | 2005-317041 | 11/2005 |
| JP | 2006-050463 | 2/2006 |
| WO | WO2005/034373 A2 | 4/2005 |

OTHER PUBLICATIONS

Sony Ericsson M600i. User Guide Publication No. EN/LZT 162 038 R3A. Sony Ecrisson Mobile Communications AB, 2006, pp. 2-3, 5, 9-10, 49, and 83.

Anon.: "Wayback Machine listing for the publication date of the file M600i_UG_R2a" Achive.org, Oct. 8, 2007.

Sony Ericsson Mobile Communications AB: "M600i User Guide, Version R2A" Internet Citation, [Online] Jun. 25, 2006, retrieved from the Internet: URL:http://web,archive.org/web/20060625120142/www.sonyecrisson.com/downloads/M600i_UG_R2A_FR. pdf> [retrieved on Oct. 8, 2007).

Sony Ericsson Mobile Communications AB: "P900i White Paper, Version RIA" Internet Citation, [Online] May 2006, retrieved from the Internet: URL:http//madzay.free.fr/doc/wp_p990i_rla.pdf> [retrieved on Oct. 4, 2007].

Dec. 15, 2014, Chinese Office Action for related CN application No. 201310354536.9.

\* cited by examiner

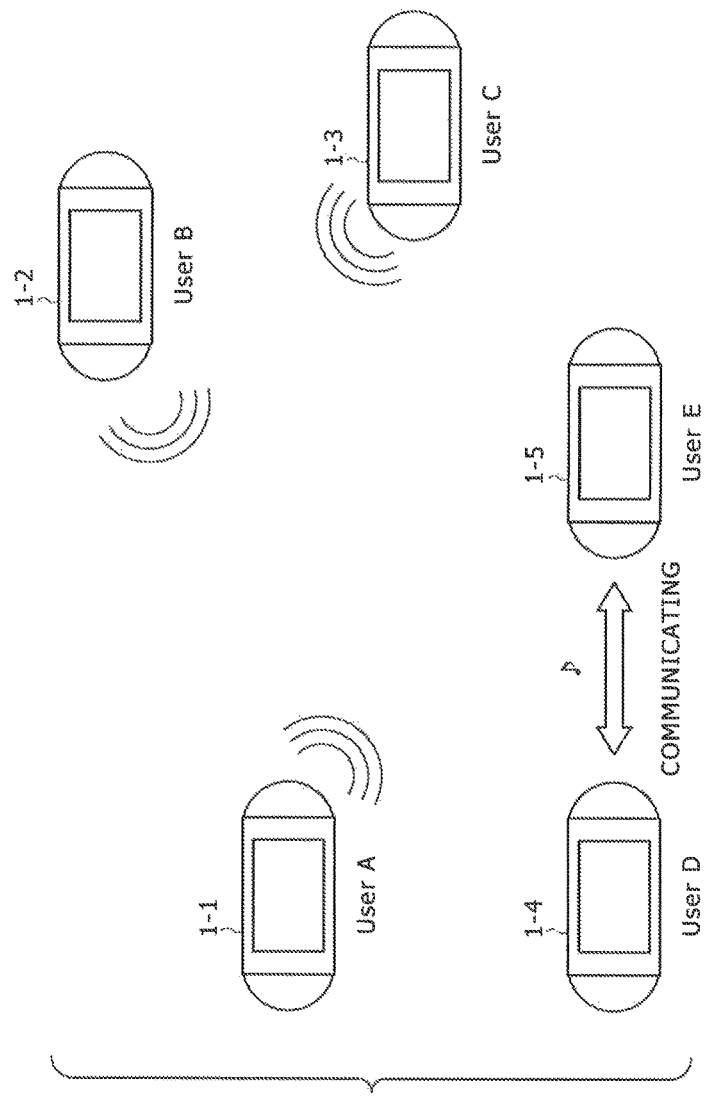

FIG. 22

| ITEM | SUBSTANCE |
|---|---|
| UNIQUE IP ADDRESS/PORT TO SELF STATION | IP ADDRESS AND PORT NUMBER |
| UNIQUE ID TO SELF STATION | UNIQUE ID TO APPARATUS |
| USER ID | USER ID TO WITH PROFILE SET |
| CONNECTION PERMISSION/ INHIBITION INFORMATION | BUSY OR READY OR THE LIKE |
| NOW-PLAYING MUSIC PIECE INFORMATION | MUSIC PIECE NAME, ARTIST NAME |
| SEQUENCE NUMBER OF MUSIC PIECE BEING REPRODUCED + OBJECT HANDLE | INFORMATION NESSESSARY FOR STREAMING REPRODUCTION OF MUSIC DATA PROTECTED BY COPYRIGHT |
| OTHER INFORMATION OF REPRODUCTION STATE AND SO FORTH | |
| USER TEXT MEMO | TEXT MEMO INPUTTED BY THE USER |

FIG. 23

| ITEM | SUBSTANCE |
|---|---|
| APPARATUS ID | UNIQUE ID TO APPARATUS |
| USER ID | USER ID WITH PROFILE SET |
| TEXT MEMO | TEXT DATA INPUTTED REGISTRATION BY USER |
| FACE ICON | BITMAP OF 96x96 |
| USER COLOR INFORMATION | USER COLORS (36 COLORS) SET BY USER |
| COMMUNICATION APPLICATION ID | ID OF COMMUNICATION APPLICATION |
| IM ID | ID OF INSTANT MESSENGER |

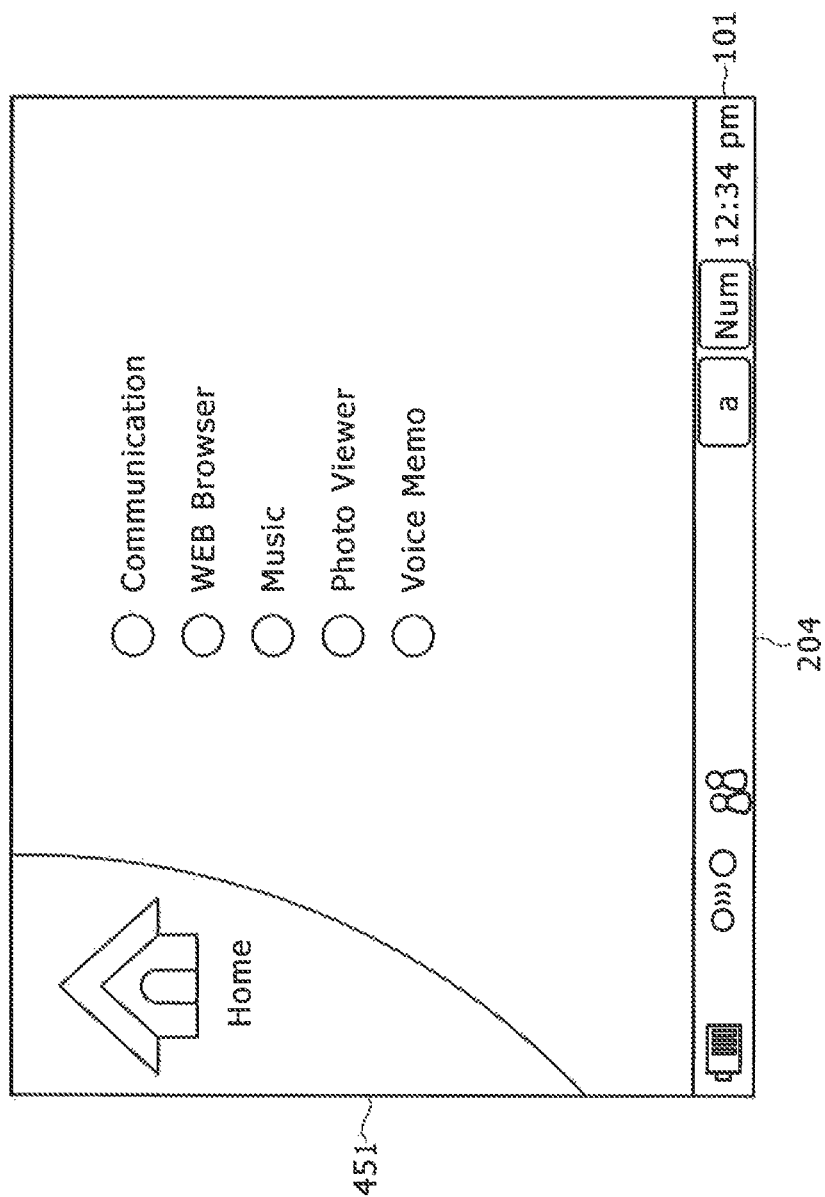

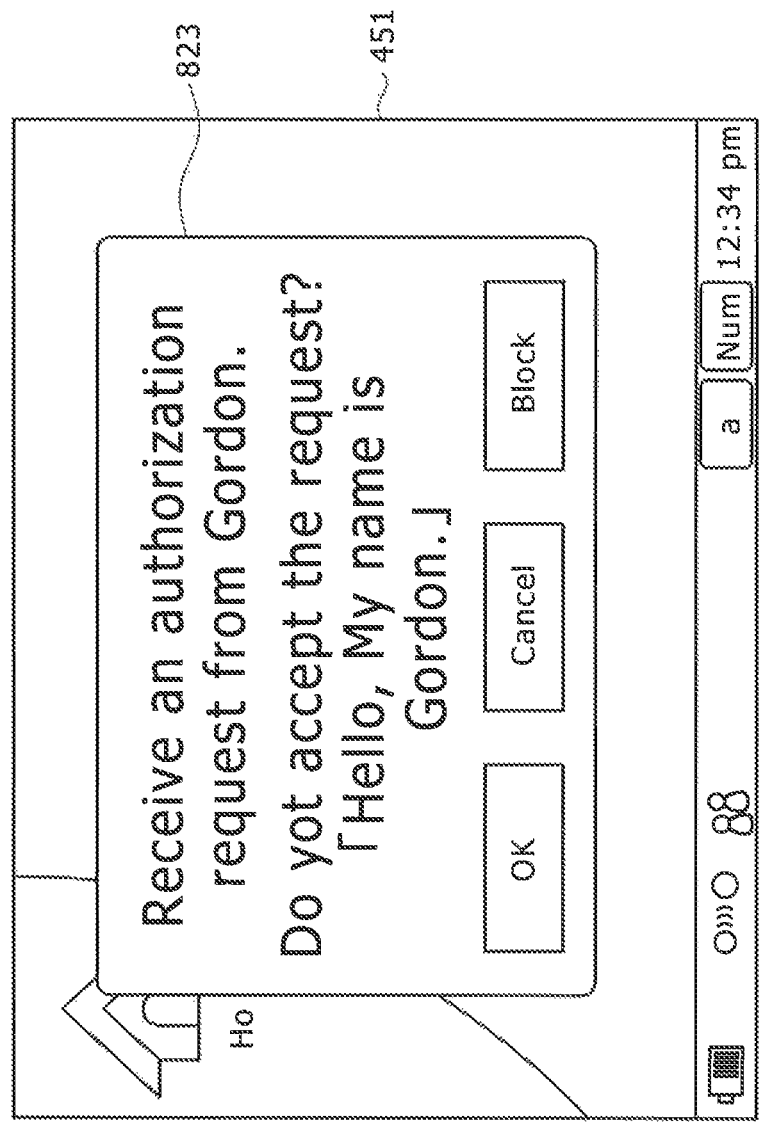

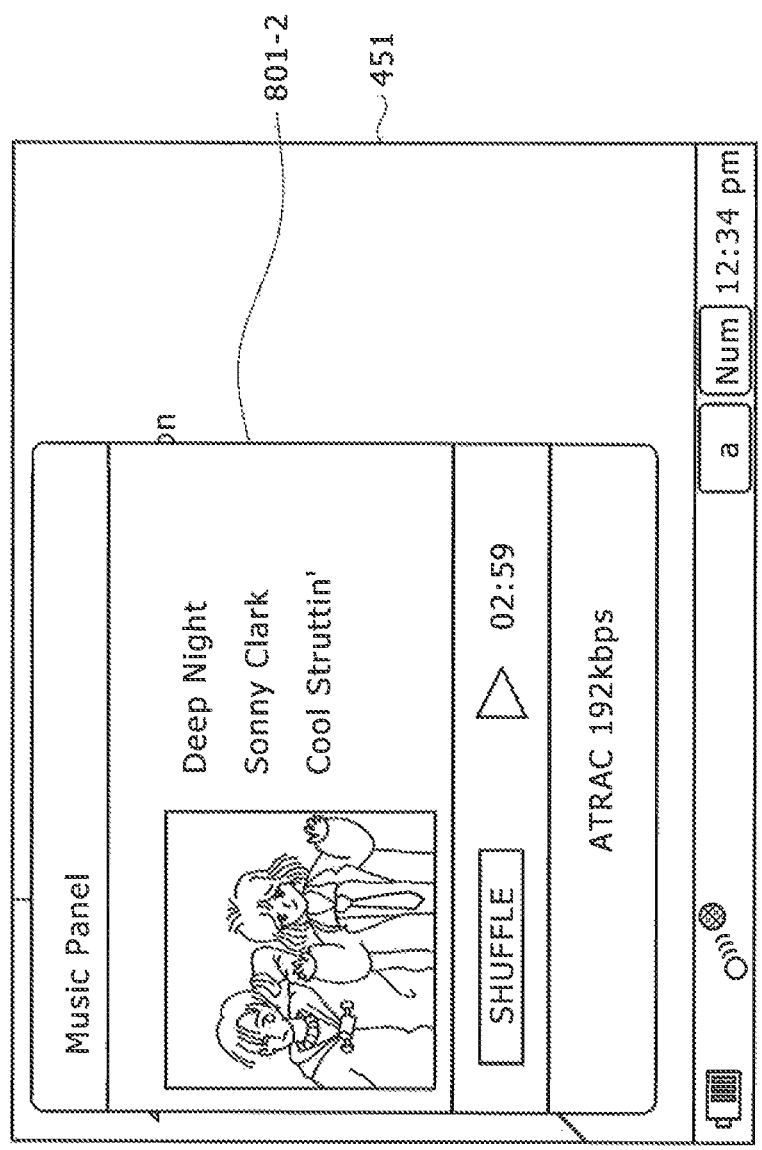

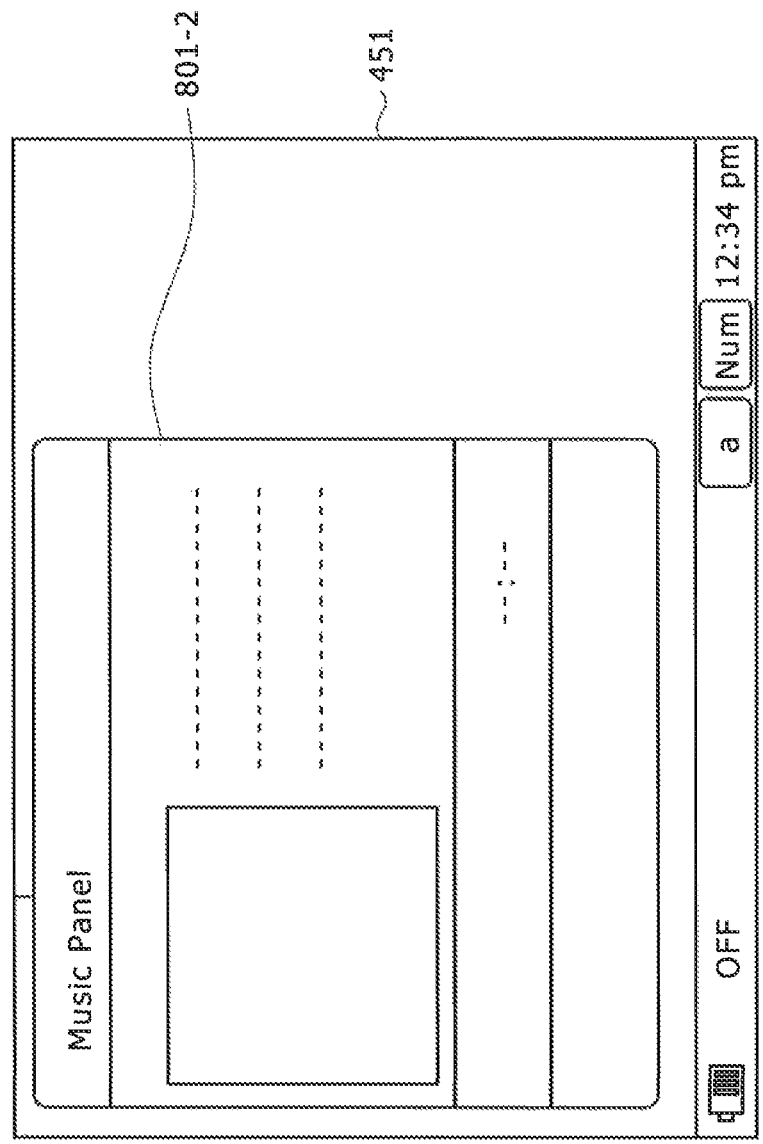

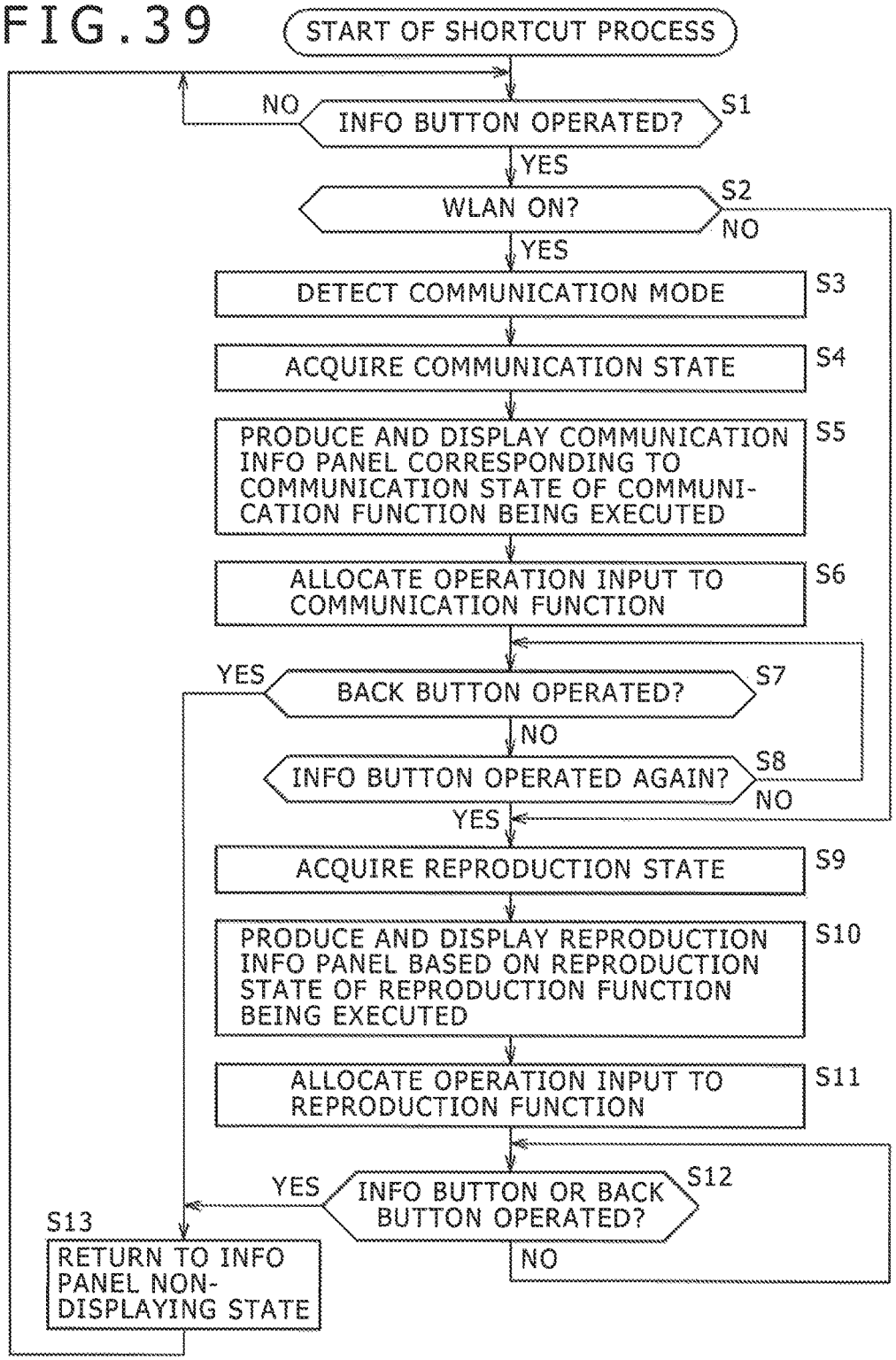

INFORMATION PROCESSING APPARATUS, INFORMATION PROCESSING METHOD AND PROGRAM

This is a continuation of application Ser. No. 11/769,371, filed Jun. 27, 2007, which claims the right to priority based on Japanese Application No. 2006-181915, filed Jun. 30, 2006, all of which are incorporated herein by reference.

CROSS REFERENCES TO RELATED APPLICATIONS

The present invention contains subject matter related to Japanese Patent Application JP 2006-181915 filed with the Japan Patent Office on Jun. 30, 2006, the entire contents of which being incorporated herein by reference.

BACKGROUND OF THE INVENTION

1. Field of the Invention

This invention relates to an information processing apparatus, an information processing method and a program, and more particularly to an information processing apparatus, an information processing method and a program suitable for use where a plurality of functions can operate in parallel.

2. Description of the Related Art

In recent years, attention is paid to the improvement in efficiency of operation means of small-sized apparatus together with miniaturization of personal computers and promotion of multi-functions of portable telephone sets or handheld game machines.

Although a large-sized apparatus allows various operation devices suitable for functions to be disposed individually thereon, a small-sized apparatus is restricted in terms of the region in which operation devices can be disposed.

Therefore, it has been proposed to allocate an operation input from an operation device to a plurality of functions. For example, Japanese Patent Laid-Open No, 2005-317041 discloses an apparatus wherein the function to which an operation input from an operation device is allocated can be selected in response to a contact pressure of a user to the operation device.

SUMMARY OF THE INVENTION

However, in the apparatus described above, the function which can be selected by a contact pressure is determined in advance in accordance with the contact pressure. However, an apparatus has not been proposed as yet wherein, for example, while a plurality of functions are being executed simultaneously, the function to be allocated to an operation input is determined in relation to the functions being executed.

Therefore, it is demanded to provide an information processing apparatus of a small size such as a small-sized terminal apparatus, an information processing method and a program wherein a plurality of functions can be executed in parallel and an operation input from an operation device can be allocated to one of the functions being executed in parallel.

According to an embodiment of the present invention, there is provided an information processing apparatus capable of simultaneously executing a reproduction function of content data and a communication function with an external apparatus, including a reproduction section, a communication control section, an operation input allocation section, an operation input acquisition section, and a display control section. The reproduction section is configured to execute the reproduction function. The communication control section is configured to execute the communication function using a communication section. The operation input allocation section is configured to allocate an operation input from a first operation section to the reproduction function or the communication function. The operation input acquisition section is configured to acquire an operation input from a second operation section. The display control section is configured to cause a display section to display information relating to the reproduction function or information relating to the communication function. The operation input allocation section is operable to allocate, when the information relating to the communication function is displayed on the display section by the display control section, the operation input from the first operation section to the communication function but allocate, when the operation input from the second operation section is acquired by the operation input acquisition section while the operation input from the first operation section is allocated to the communication function, the operation input from the first operation section to the reproduction function.

Preferably, the display control section controls the display section to display the information relating to the reproduction function when the operation input from the second operation section is acquired by the operation input acquisition section while the information relating to the communication function is displayed on the display section.

Preferably, the operation input allocation section allocates the information inputted from the first operation section to the communication function when the operation input from the second operation section is acquired by the operation input acquisition section while the operation input from the first operation section is not allocated to any of the communication function and the reproduction function. In this instance, preferably the operation input allocation section allocates the information inputted from the first operation section to the reproduction function when the operation input from the second operation section is acquired by the operation input acquisition section after the information inputted from the first operation section is allocated to the communication function. Further preferably, the display control section controls the display section to display the information relating to the communication function when the operation input from the second operation section is acquired by the operation input acquisition section while none of the information relating to the communication function and the information relating to the reproduction function is displayed on the display section, and further controls the display section to display the information relating to the reproduction function when the operation input from the second operation section is acquired by the operation input acquisition section.

The information relating to the communication function is information according to the communication state by the communication function, and the information relating to the reproduction function is information according to the reproduction state by the reproduction function.

Preferably, the information processing apparatus is configured such that it further includes a storage section in which contents to be reproduced by the reproduction function are stored, and the information relating to the reproduction function includes information representing whether a content being reproduced by the reproduction function is one of the contents stored in the storage section or a content acquired from the external apparatus through the communication section.

Or, the display control section may control, where a content reproduced by the reproduction function has been transmitted to the external apparatus, the display section to display information representing that the content has been outputted to the external apparatus as the information relating to the reproduction information.

Or else, the display control section may control the display section to display, when a new event occurs with the communication function, a representation that a new event has occurred as the information according to the communication state by the communication function.

According to another embodiment, there are provided an information processing method capable of simultaneously executing a reproduction function of content data and a communication function with an external apparatus and a recording medium in or on which a computer readable program is recorded. The information processing method and the program, which causes a computer to execute an information process, include the steps of:

executing the reproduction function;

executing the communication function using a communication section;

allocating an operation input from a first operation section to the reproduction function or the communication function;

acquiring an operation input from a second operation step; and causing a display section to display information relating to the reproduction function or information relating to the communication function. The operation input allocation step includes allocation, when the information relating to the communication function is displayed on the display section by the process at the display control step, of the operation input from the first operation section to the communication function, and allocation, when the operation input, from the second operation section is acquired by the process at the operation input acquisition section while the operation input from the first operation section is allocated to the communication function, of the operation input from the first operation section to the reproduction function.

Preferably, the information processing method is configured such that the display control step controls the display section to display the information relating to the reproduction function when the operation it from the second operation section is acquired by the process at the operation input acquisition step while the information relating to the communication function is displayed on the display section.

In the information processing apparatus, information processing method and recording medium on or in which the program is recorded, the reproduction function and the communication function are executed. Further, an operation input from the first operation section is allocated to the reproduction function or the communication function. Further, an operation input from the second operation section is acquired, and information relating to the reproduction function or information relating to the communication function is displayed on the display section. Thus, when information relating to the communication function is allocated to the communication function, the operation input from the first operation section is allocated to the communication section. Then, when the operation input from the second operation section is acquired while the information relating to the communication, function is displayed on the display section, the operation input from the first operation section is allocated to the reproduction function. However, when the operation input from the second operation section is acquired while the information relating to the communication function is displayed on the display section, the information relating to the reproduction function is displayed on the display section.

Thus, where the information processing apparatus, information processing method and recording medium on or in which the program is recorded are applied, for example, to a small-sized terminal apparatus which can execute a plurality of functions in parallel, an operation from any of the operation sections can be applied suitably to the functions which are being executed in parallel.

The above and other features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 21 is a schematic view illustrating communication in an ad hoc mode in the information communication system;

FIG. 22 is a view illustrating an example of information to be transmitted in broadcasting from the information communication terminal in the ad hoc mode;

FIG. 23 is a view illustrating an example of user information communicated for registration between the information communication terminal and a communication opposite party;

FIG. 33 is a schematic view showing a further example of display of the HOME screen;

FIG. 34 is a schematic view illustrating a different example of utilization of the communication INFO panel;

FIGS. 35, 36, 37A and 37B, and 38A and 38B are schematic views showing different examples of display of the communication INFO pane;

FIG. 39 is a flow chart illustrating the shortcut process;

DETAILED DESCRIPTION OF THE PREFERRED EMBODIMENT

Figure 1:
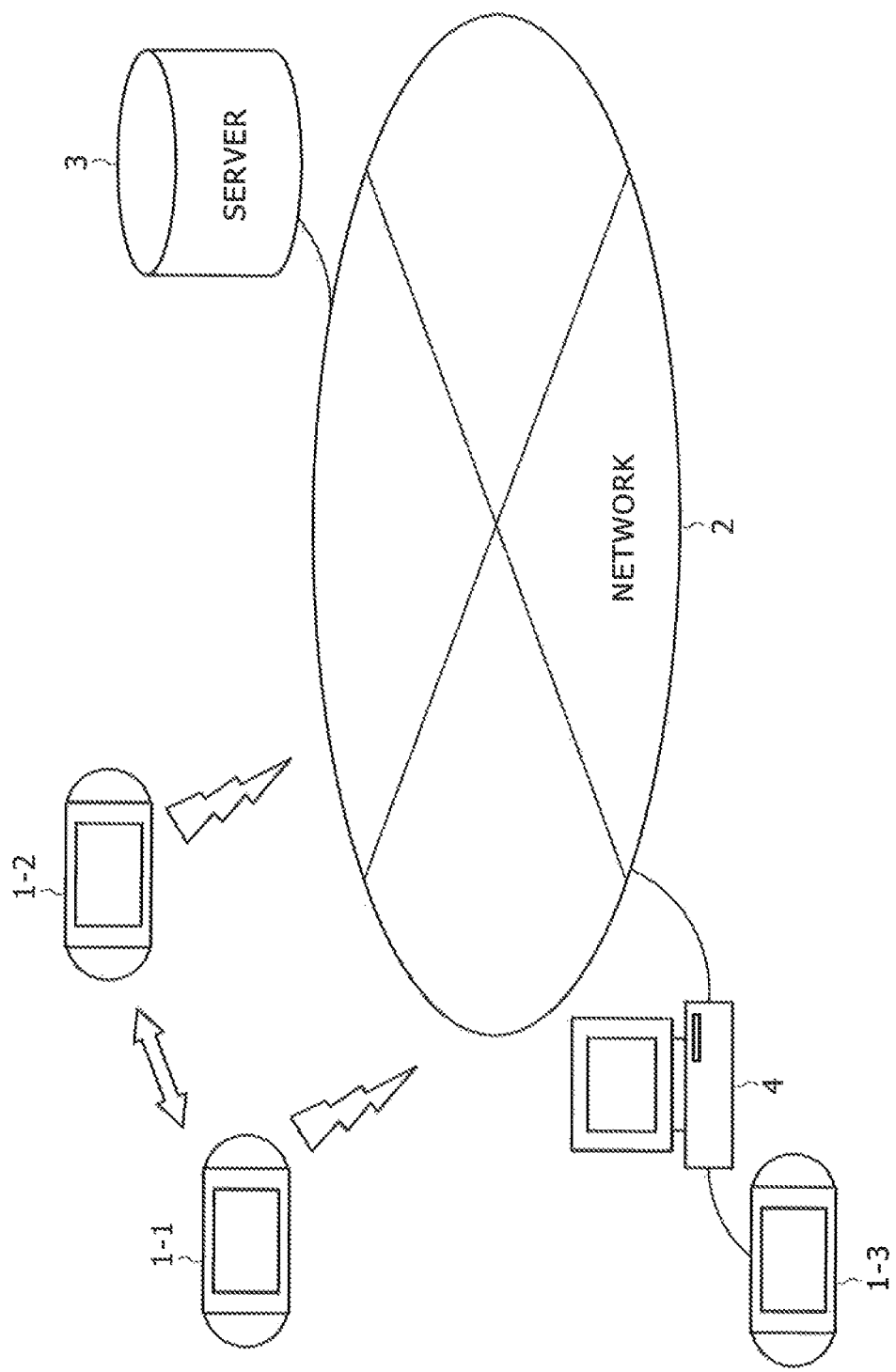
FIG. 1 is a schematic view showing an information communication system including an information communication terminal to which the present invention is applied.

Before a preferred embodiment of the present invention is described in detail, a corresponding relationship between several features recited in the accompanying claims and particular elements of the preferred embodiment described below is described. The description, however, is merely for the confirmation that the particular elements which support the invention as recited in the claims are disclosed in the description of the embodiment of the present invention. Accordingly, even if some particular element which is recited in description of the embodiment is not recited as one of the features in the following description, this does not signify that the particular element does not correspond to the feature. On the contrary, even if some particular element is recited as an element corresponding to one of the features, this does not signify that the element does not correspond to any other feature than the element.

According to an embodiment of the present invention, there is provided an information processing apparatus capable of simultaneously executing a reproduction function of content data and a communication function with an external apparatus, including a reproduction section, a communication control section, an operation input allocation section, an operation input acquisition section, and a display control section. The reproduction section is configured to execute the reproduction function (for example, an application processor 131 of FIG. 11). The communication control section (for example, the application processor 131 of FIG. 11) is configured to execute the communication function using a communication section. The operation input allocation section (for example, an operation input allocation section 906 of FIG. 28) is configured to allocate an operation input from a first operation section (for example, a four-direction key 26 of FIG. 2) to the reproduction function or the communication function. The operation input acquisition section (for example, a shortcut operation inputting section 901 of FIG. 28) is configured to acquire an operation input from a second operation section (got example, an INFO button 11 of FIG. 2). The display control section (for example, an INFO panel production section 905 of FIG. 28) is configured to cause a display section to display information relating to the reproduction function or information relating to the communication function. The operation input allocation section is operable to allocate, when the information relating to the communication function is displayed on the display section by the display control section, the operation input from the first operation section to the communication function but allocate, when the operation input from the second operation section is acquired by the operation input acquisition section while the operation input from the first operation section is allocated to the communication function, the operation input from the first operation section to the reproduction function (for example, at step S11 of FIG. 39). Preferably, the display control section controls the display section to display the information relating to the reproduction function when the operation input from the second operation section is acquired by the operation input acquisition section while the information relating to the communication function is displayed on the display section (for example, at step S10 of FIG. 39).

Preferably, the operation input allocation section allocates the information inputted from the first operation section to the communication function when the operation input from the second operation section is acquired by the operation input acquisition section while the operation input from the first operation section is not allocated to any of the communication function and the reproduction function (for example, at step S6 of FIG. 39). In this instance, preferably the operation input allocation section allocates the information inputted from the first operation section to the reproduction function when the operation input from the second operation section is acquired by the operation input acquisition section after the information inputted from the first operation section is allocated to the communication function (for example, at step S11 of FIG. 39). Further preferably, the display control section controls the display section to display the information relating to the communication function when the operation input from the second operation section is acquired by the operation input acquisition section while none of the information relating to the communication function and the information relating to the reproduction function is displayed on the display section (for example, at step S5 of FIG. 39). The display control section further controls the display section to display the information relating to the reproduction function when the operation input from the second operation section is acquired by the operation input acquisition section (for example, at step S10 of FIG. 39).

The information relating to the communication function is information according to the communication state by the communication function (for example, FIG. 29 or 32), and the information relating to the reproduction function is information according to the reproduction state by the reproduction function (for example, FIG. 35).

Preferably, the information processing apparatus is configured such that it further includes a storage section (for example, a large capacity flash memory 154 of FIG. 11) in which contents to be reproduced by the reproduction function are stored, and the information (for example, a reproduction INFO panel 801-2 of FIG. 37B) relating to the reproduction function includes information representing whether a content being reproduced by the reproduction function is one of the contents stored in the storage section or a content acquired from the external apparatus through the communication section.

The display control section may control, where a content reproduced by the reproduction function has been transmitted to the external apparatus, the display section to display information (for example, a reproduction INFO panel 801-2 of FIG. 38B) representing that the content has been outputted to the external apparatus as the information according to the reproduction information.

The display control section may control the display section to display, when a new event occurs with the communication function, a representation (for example, FIG. 30 or 33) that a new event has occurred as the information according to the communication state by the communication function.

Figure 12:
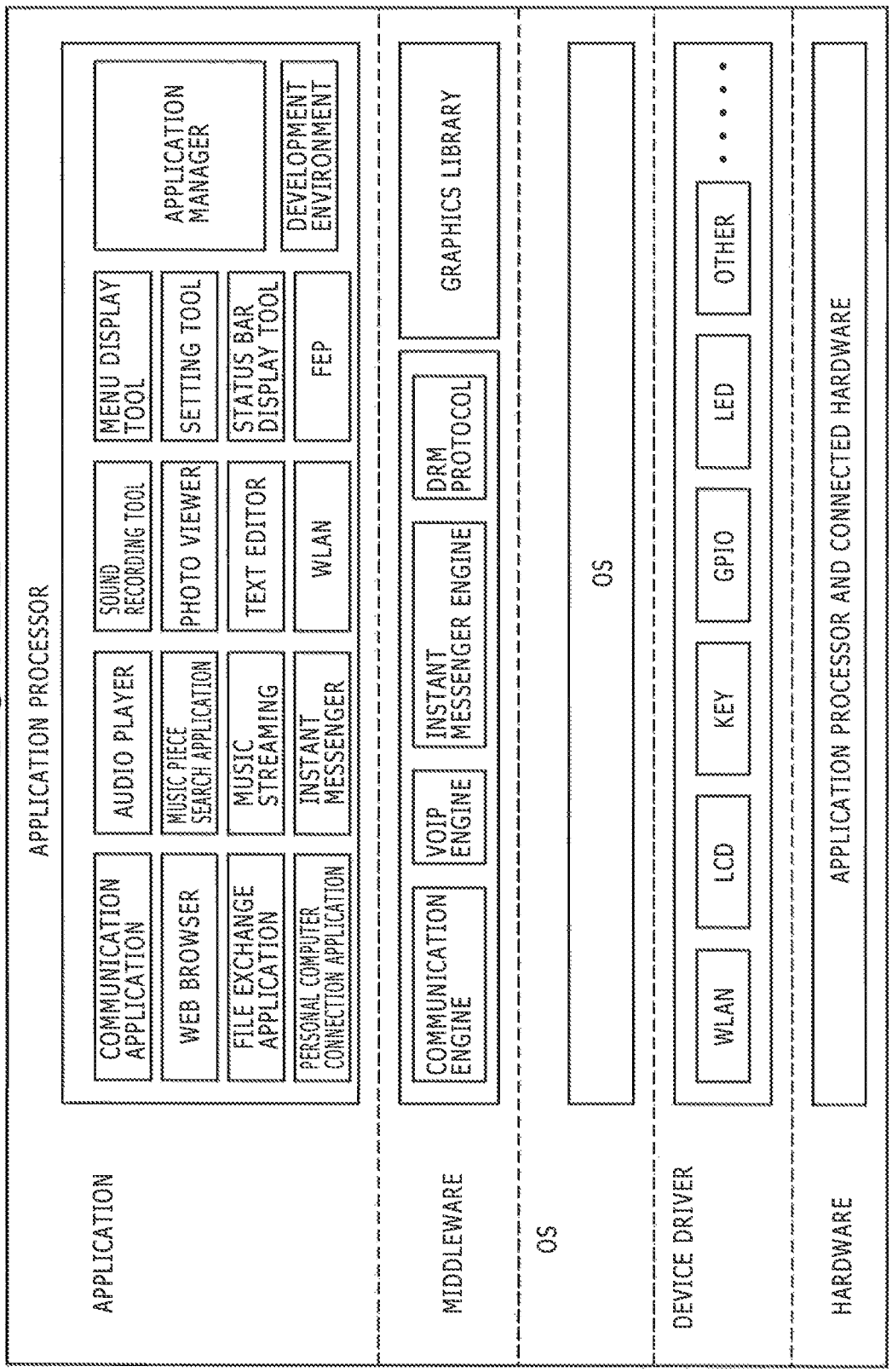
FIG. 12 is a diagrammatic view of a software stack illustrating a configuration of pieces of software for being executed by an application processor of the information communication terminal.

According to another embodiment, there are provided an information processing method capable of simultaneously executing a reproduction function of content data and a communication function with an external apparatus and a recording medium in or on which a computer readable program is recorded. The information processing method and the program, which causes a computer to execute an information process, include the steps of:

executing the reproduction function (for example, an audio player of FIG. 12);

executing the communication function (for example, a communication application of FIG. 12) using a communication section;

allocating an operation input from a first operation section to the reproduction function or the communication function (for example, an application manager of FIG. 12);

acquiring an operation input from a second operation step (for example, an application manager of FIG. 12); and causing a display section to display information relating to the reproduction function or information relating to the communication function (for example, the application manager of FIG. 12). The operation input allocation step includes allocation (for example, at step S11 of FIG. 39), when the information relating to the communication function is displayed on the display section by the process at the display control step, of the operation input from the first operation section to the communication function. The operation input allocation step also includes allocation (for example, at step S10 of FIG. 39), when the operation input from the second operation section is acquired by the process at the operation input acquisition section while the operation input from the first operation section is allocated to the communication function, of the operation input from the first operation section to the reproduction function.

In the following, a preferred embodiment of the present invention is described with reference to the accompanying drawings.

Referring first to FIG. 1, there is shown an information communication system which includes information communication terminals to which the present invention is applied. The information processing terminals 1-1 to 1-3 of the information communication system have same functions, and therefore, in the following description, where there is no necessity to distinguish the information processing terminals 1-1 to 1-3 from one another, each of them is referred to simply as information communication terminal 1. This similarly applies also to a like case.

The information communication terminal 1 is a comparatively large portable apparatus which has various functions and can be held by one hand by a user.

The information communication terminal 1 has an information communication function, for example, by wireless communication and wire communication.

In particular, the information communication terminal 1 has a WLAN (Wireless Local Area Network; wireless LAN) function, for example, conforming to the 802.11b standards and can establish a connection to and communicate information with another apparatus.

In the system shown in FIG. 1, the information communication terminal 1 can execute a predetermined application to establish a connection directly to a network 2 such as the Internet by wireless communication. Thus, the information communication terminal 1 can communicate information with various servers 3, a personal computer 4 or another information communication terminal 1 (as indicated by the information processing terminals 1-1 and 1-2 in FIG. 1) through the network 2.

Also it is possible for the information communication terminal 1 to execute another predetermined application to communicate information directly with another information communication terminal 1 (as indicated by the information processing terminals 1-1 and 1-2 in FIG. 1) by wireless communication.

While an infrastructure mode application which implements wireless communication conforming to the 802.11b standards is available, the information communication terminal 1 can selectively use one of an infrastructure mode and an ad hoc mode in the WLAN.

The WLAN infrastructure mode is a system wherein communication is performed through a wireless LAN access point. The WLAN ad hoc mode is a system wherein data are communicated directly between different apparatus without intervention of a wireless LAN access point.

As applications for performing a process utilizing communication processes of the infrastructure mode, communication applications which provide such functions as an IP telephone, instant messengers which provide such functions as chatting, web browsers for accessing a web page and electronic mail applications are available.

As applications for performing a process utilizing communication processes of the ad hoc mode, file exchange applications for allowing file transfer to be carried out between different information processing terminals 1 (indicated by the information processing terminals 1-1 and 1-2 in FIG. 1) of the ad hoc mode which exist within a range within which ad hoc communication is possible and music applications for performing streaming of music data are available.

Further, the information communication terminal 1 can establish a connection to another apparatus by wire connection, for example, in accordance with the USE (Universal Serial Bus) 2.0 standards to communicate information with the apparatus.

The information communication terminal 1 further has a function of recording various kinds of information and another function of reproducing sound and images.

More particularly, the information communication terminal 1 can record or reproduce sound data supplied thereto by executing various applications in accordance with an audio codec system such as, for example, ATRAC (Advanced Transform Acoustic Coding) 3, MP3 (MPEG Audio Layer-3) or WMA (Windows (registered trademark) Media Audio).

An audio player is available as one of applications for reproducing music data. Also a music application for performing streaming of music data between those information processing terminals 1 of the ad hoc mode which exist within a range within which ad hoc communication is possible is one of applications of the type described.

The information communication terminal 1 further includes a Photo View function and can store and reproduce image data.

Furthermore, the information communication terminal 1 includes a function of displaying various kinds of information including a reproduced image, information (GUI (Graphic User Interface)) for assisting a user in operation inputting and so forth.

In particular, the information communication terminal 1 includes, for example, an LCD (Liquid Crystal Display) unit as a display device and includes a keyboard and so forth as inputting devices. Consequently, the information communication terminal 1 can display various kinds of information including an image, various GUIs and so forth and input an operation input of the user from various input devices.

The information communication terminal 1 has such a plurality of functions as described above and can execute several ones of the functions simultaneously.

In particular, the user can start, for example, a browser to utilize the Internet while it starts the audio player to enjoy a piece of music. Further, even when the user starts the audio player and enjoys a piece of music, the information communication terminal 1 can accept an access through the instant messenger in the infrastructure mode of the WLAN.

Further, while the user starts the music application in the ad hoc mode of the WLAN to perform streaming reproduction, the information communication terminal 1 can accept an access from another apparatus in the ad hoc mode.

Further, when the information communication terminal 1 executes a plurality of functions simultaneously in this manner, a function to which immediate accessing is useful from among the functions operating in parallel on the background can be accessed (that is, through a shortcut) simply by the information communication terminal 1 by depressing an INFO button hereinafter described.

Although details are hereinafter described with reference to FIGS. 27 to 39, if the INFO button is depressed while a plurality of functions are being executed simultaneously on the information communication terminal 1, then a predetermined operation panel (hereinafter referred to as INFO panel) for utilizing the functions operating on the background is displayed. Then, an operation input from a predetermined operation section is allocated to the newly accessed function.

In other words, the user can reach the functions operating on the background through a shortcut by a simple operation of depression of the INFO button and can utilize the function rapidly.

Usually, in a terminal which can execute a plurality of functions, GUIs for accessing the functions are prepared hierarchically, and the user can reach the functions operating on the background by changing the hierarchies of the GUIs in accordance with a predetermined procedure. In contrast, according to the information communication terminal 1, the functions operating on the background can be reached simply through a shortcut if the INFO button is operated.

That it is possible to reach those functions which are operating on the background through a shortcut is particularly useful in an apparatus having increasing multiple functions. Further, that a function newly accessed can be controlled by the same operation mechanism is useful particularly to a small size terminal which is restricted in terms of the region in which operation mechanisms are to be disposed and does not allow disposition thereon of operation mechanisms corresponding to individual functions.

Figure 2:
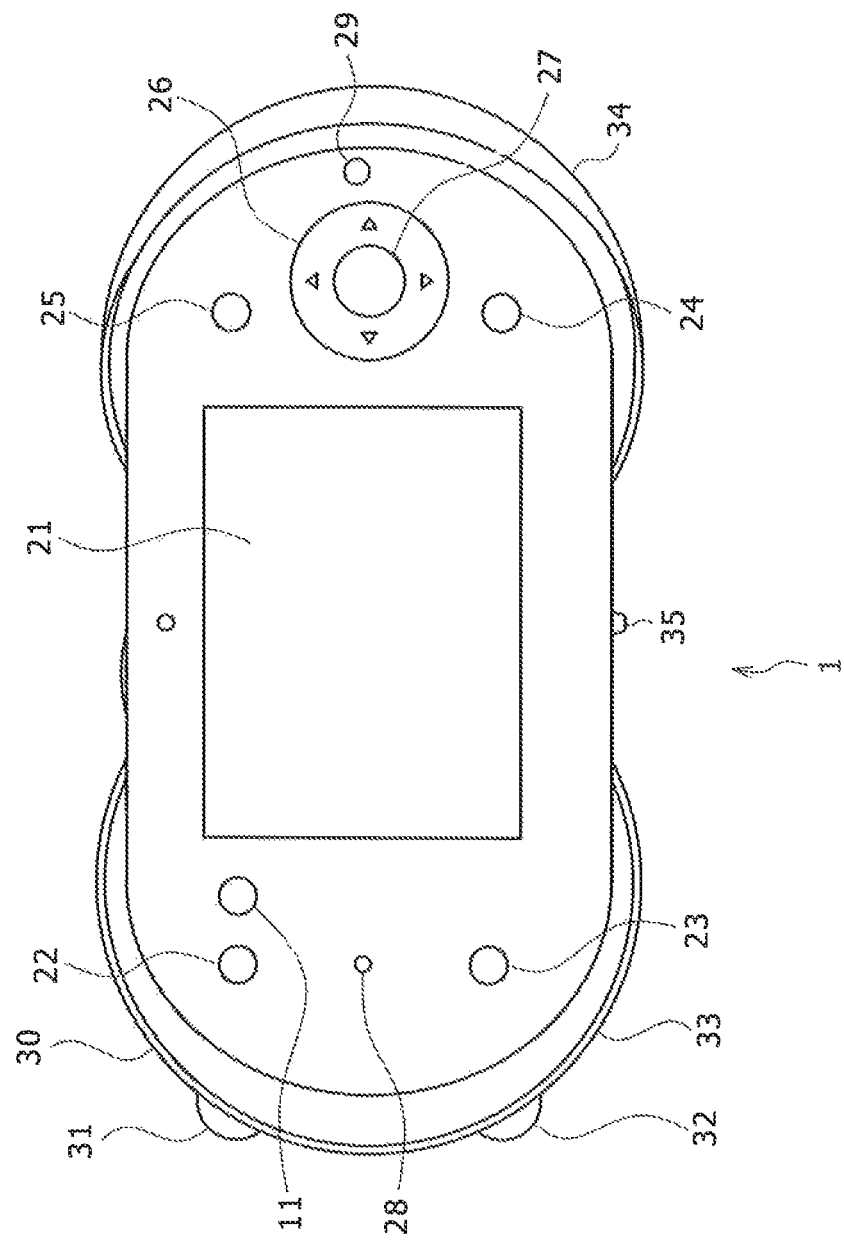
FIG. 2 is a front elevational view showing an outer appearance of the information communication terminal.

Now, an outer appearance of the information communication terminal 1 is described with reference to FIGS. 2 to 8. FIG. 2 shows an outer profile of the front of the information communication terminal 1.

Referring first to FIG. 2, the information communication terminal 1 includes an INFO button 11, a display section 21, a. WLAN mode changeover button 22, a HOME button 23, a BACK button 24, an option button 25, a four-direction key 26, a determination button 27, a speaker 28 and a microphone 29 provided on the front face thereof. Further, the information communication terminal 1 includes a WLAN ON/OFF switch 30, a WLAN state indicating light emitting section 31, a power supply state indicating light emitting section 32 and a power supply switch 33 provided on a face thereof on the left side with respect to the display section 21. Further, the information communication terminal 1 includes a communication state indicating light emitting section 34 provided on a face thereof on the right side with respect to the display section 21. Further, the information communication terminal 1 includes a music key 35 provided on a face on the lower side in FIG. 2 with respect to the display section 21.

The INFO button 11 is operated in order to take, while a plurality of functions are being executed, a shortcut to a predetermined one of those functions which are operating on the background.

The display section 21 is formed from a planar display apparatus such as, for example, an LCD apparatus and can display various kinds of information.

The WLAN mode changeover button 22 is used to perform an operation input for changing over the wireless LAN between on and off states.

The HOME button 23 is used to perform an operation input for causing a HOME menu hereinafter described with reference to FIG. 13 to be displayed on the display section 21 irrespective of the type of information currently displayed on the display section 21.

The BACK button 24 is used to perform an operation input for returning the display screen to the last screen.

The option button 25 is used to perform an operation input for causing a display function for setting various options to be displayed.

The four-direction key 26 is used to perform an operation input, for example, for moving a cursor or changing selection of a button or an icon on the information displayed on the display section 21.

The determination button 27 is used to perform an operation input to determine selection of a menu item, button or an icon in a selected state.

The speaker 28 outputs voice of telephone conversation in a case wherein, for example, an IP telephone is used and outputs sound reproduced by a predetermined application from among sound data recorded in the information communication terminal 1

The microphone 29 is used to input voice of telephone conversation in a case wherein, for example, an IP telephone is used, and collects sound acquired by a predetermined application.

The WLAN ON/OFF switch 30 is operated by the user in order to change over the wireless communication function of the information communication terminal between valid and invalid states.

The WLAN state indicating light emitting section 31 is formed from one or a plurality of light emitting elements such as, for example, light emitting diodes and a light guiding pipe to notify the user of whether the wireless communication function of the information communication terminal 1 is valid or invalid.

The power supply state indicating light emitting section 32 is formed from one or a plurality of light emitting elements such as, for example, light emitting diodes to notify the user of whether or not the power supply to the information communication terminal 1 is on or whether charging is proceeding or is completed with the information communication terminal 1.

The power supply switch 33 is used to turn on or off the power supply to the information communication terminal 1.

The communication state indicating light emitting section 34 is formed from one or a plurality of light emitting elements such as, for example, LEDs to notify the user of a communication state of the information communication terminal 1.

The music key 35 is used to perform an operation input for starting of reproduction, ending of reproduction, fast feeding, rewinding, pause, AMS (Auto Music Scan) in the forward and backward directions and so forth where sound data are reproduced on the information communication terminal 1.

Figure 3:
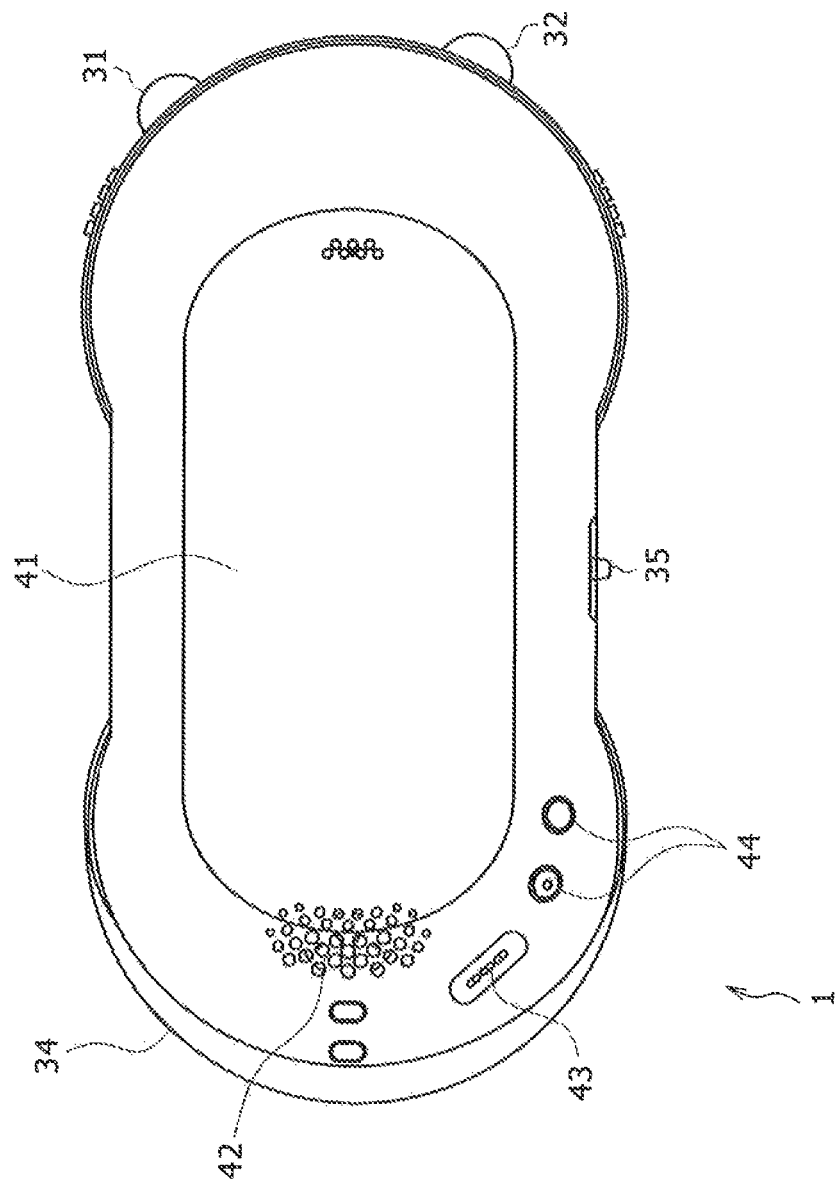
FIG. 3 is a rear elevational view showing an outer appearance of a rear side of the information communication terminal on which a display section is not provided.

FIG. 3 shows an outer profile of the back side of the information communication terminal 1 on which the display section 21 is not provided.

A battery cover 41 is provided on the back side of the information communication terminal 1, and a ringer speaker 42, a HOLD switch 43 and a volume button 44 are provided on the side of the back side of the information communication terminal 1 on which the communication state indicating light emitting section 34 is provided.

The battery cover 41 covers an accommodation portion of the information communication terminal 1, in which a battery for supplying power to the components of the information communication terminal 1 is accommodated, and the battery accommodated in the accommodation portion.

The ringer speaker 42 principally reproduces and outputs music data from among sound data accumulated in the information communication terminal 1, music data streamed from another information communication terminal 1 and like music data. Further, the ringer speaker 42 reproduces and outputs a ring where an IP telephone is used.

The HOLD switch 43 is operated in order to invalidate an input of, for example, any button or switch.

The volume button 44 is operated in order to adjust the volume of sound to be outputted from the ringer speaker 42.

Figure 4:
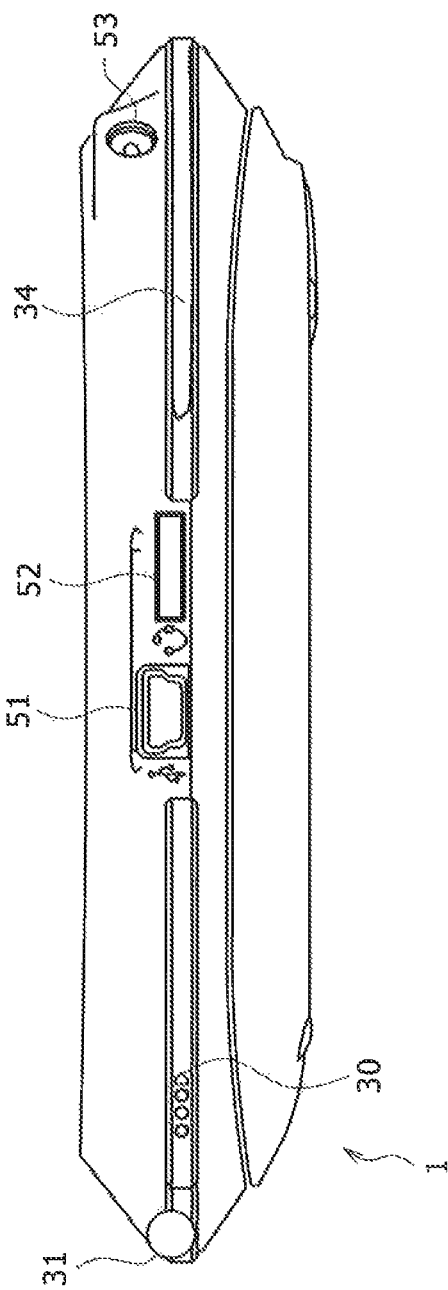
FIG. 4 is a side elevational view showing an outer appearance of an upper side face of the information communication terminal on which a WLAN ON/OFF switch is provided.

FIG. 4 shows an outer profile of an upper side face of the information communication terminal 1 on which the WLAN ON/OFF switch 30 is provided.

A USB connector 51 and a connector jack 52 are provided on the upper side face of the information communication terminal 1.

A USB cable is connected to the USB connector 51 so that the information communication terminal 1 can communicate information with another apparatus through the USB connector 51 and the USB cable.

The connector jack 52 is formed, for example, from a 10-pin flat female connector and allows connection thereto of a sound inputting or outputting device such as headphones or a microphone.

Figure 5:
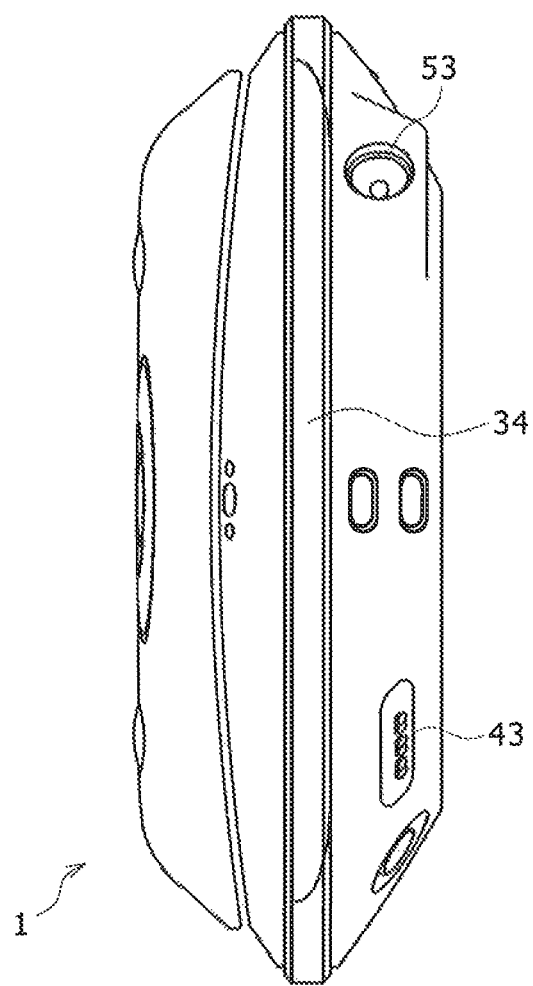
FIG. 5 is a side elevational view showing an outer appearance of a right side face, on which a communication state notification light emitting section is provided, of the information communication terminal as viewed from the side on which the display section is provided.

A DC jack 53 is used to receive supply of DC power,

FIG. 5 shows an outer profile of a right side face of the information communication terminal 1 with respect to the display section 21, that is, the face on which the communication state indicating light emitting section 34 is provided.

The communication state indicating light emitting section 34, BOLD switch 43 and DC jack 53 are disposed in such a manner as seen in FIG. 5 on the right side face of the information communication terminal 1.

Figure 6:
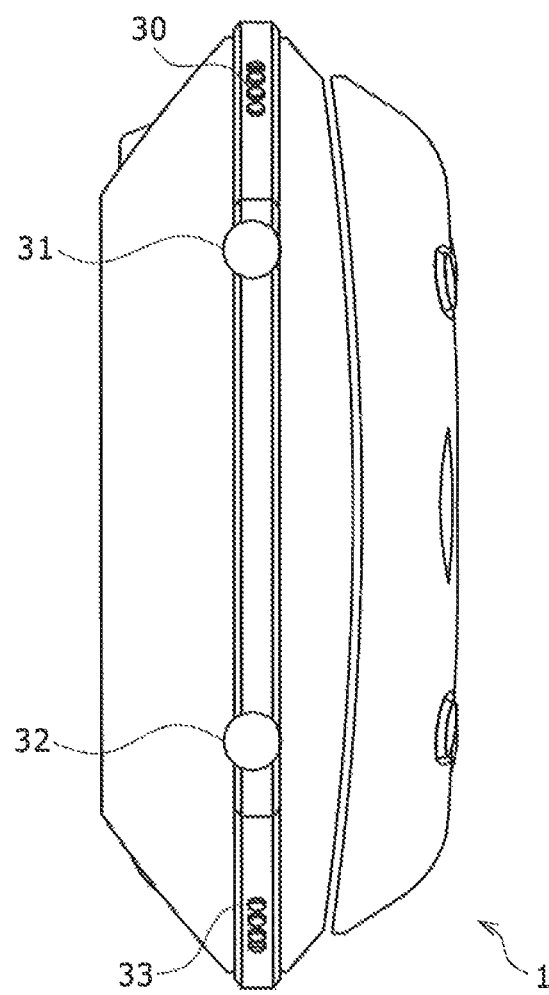
FIG. 6 is a side elevational view showing an outer appearance of a left side face, on which the WLAN ON/OFF switch and a power supply switch are provided, of the information communication terminal as viewed from the side on which the display section is provided.

FIG. 6 shows an outer profile of a left side face of the information communication terminal 1 with respect to the display section 21, that is, the face on which the WLAN ON/OFF switch 30 and power supply switch 33 are provided.

The WLAN ON/OFF switch 30, WLAN state indicating light emitting section 31, power supply state indicating light emitting section 32 and power supply switch 33 are disposed in such a manner as seen in FIG. 6 on the left side face of the information communication terminal 1.

Figure 7:
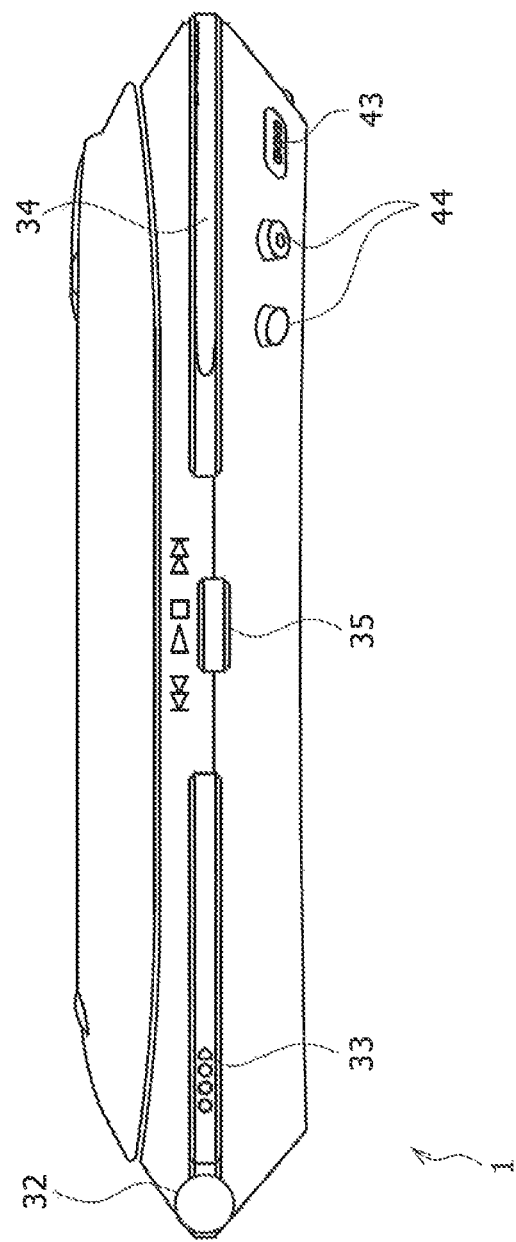
FIG. 7 is a side elevational view showing an outer appearance of a lower side face of the information communication terminal on which the power supply switch and a music key are provided.

FIG. 7 shows an outer profile of a lower side face of the information communication terminal 1 on which the power supply switch 33 and music key 35 are provided.

The power supply state indicating light emitting section 32, power supply switch 33, communication state indicating light emitting section 31, music key 35, HOLD switch 43 and power supply switch 33 are disposed in such a manner as seen in FIG. 7 on the lower side face of the information communication terminal 1.

Figure 8:
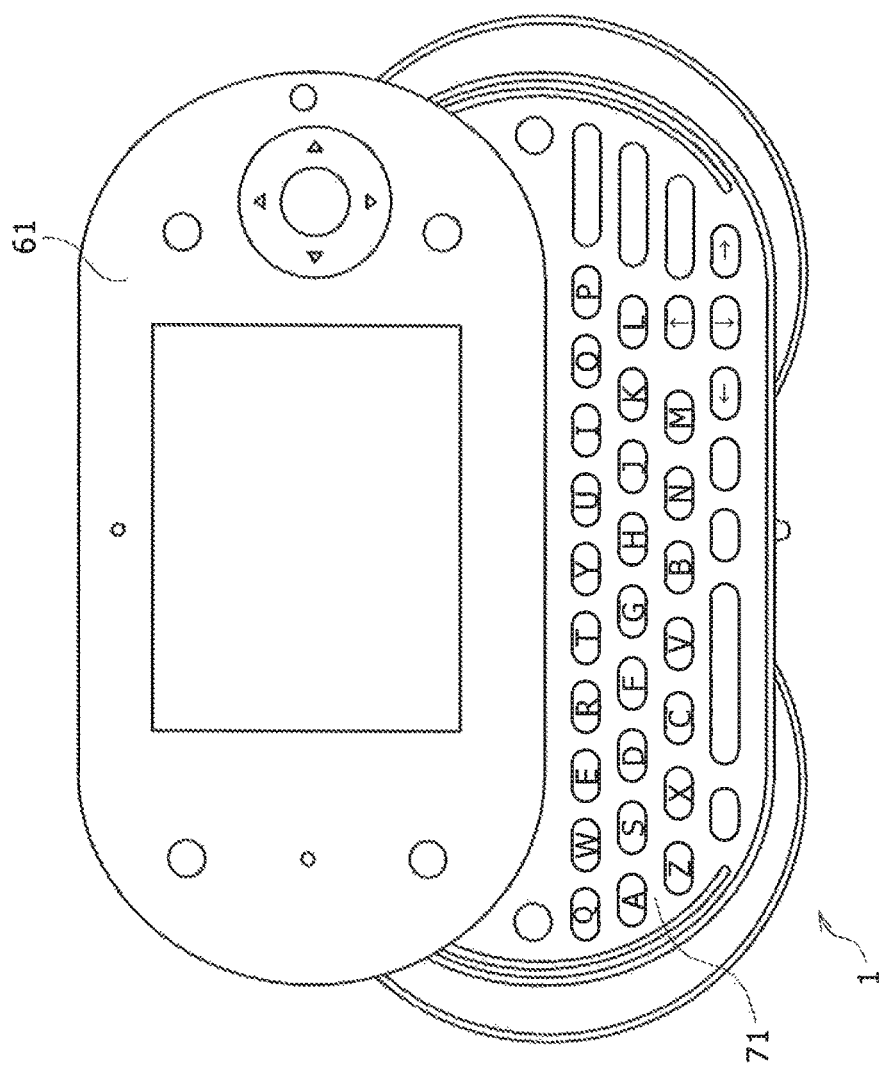
FIG. 8 is a front elevational view of the information communication terminal where a housing is slidably moved.

The information communication terminal 1 is configured such that a housing 61 on the front face of the information communication terminal 1 on which the display section 21, WLAN mode changeover button 22, HOME button 23, BACK button 24, option button 25, four direction key 25, determination button 27, speaker 28 and microphone 29 are provided can be slidably moved toward the upper side with respect to the display face of the display section 21. As a result of the sliding movement of the housing 61, a keyboard 71 appears. FIG. 8 shows an appearance of the information communication terminal 1 when the housing 61 is slidably moved in this manner.

Figure 9:
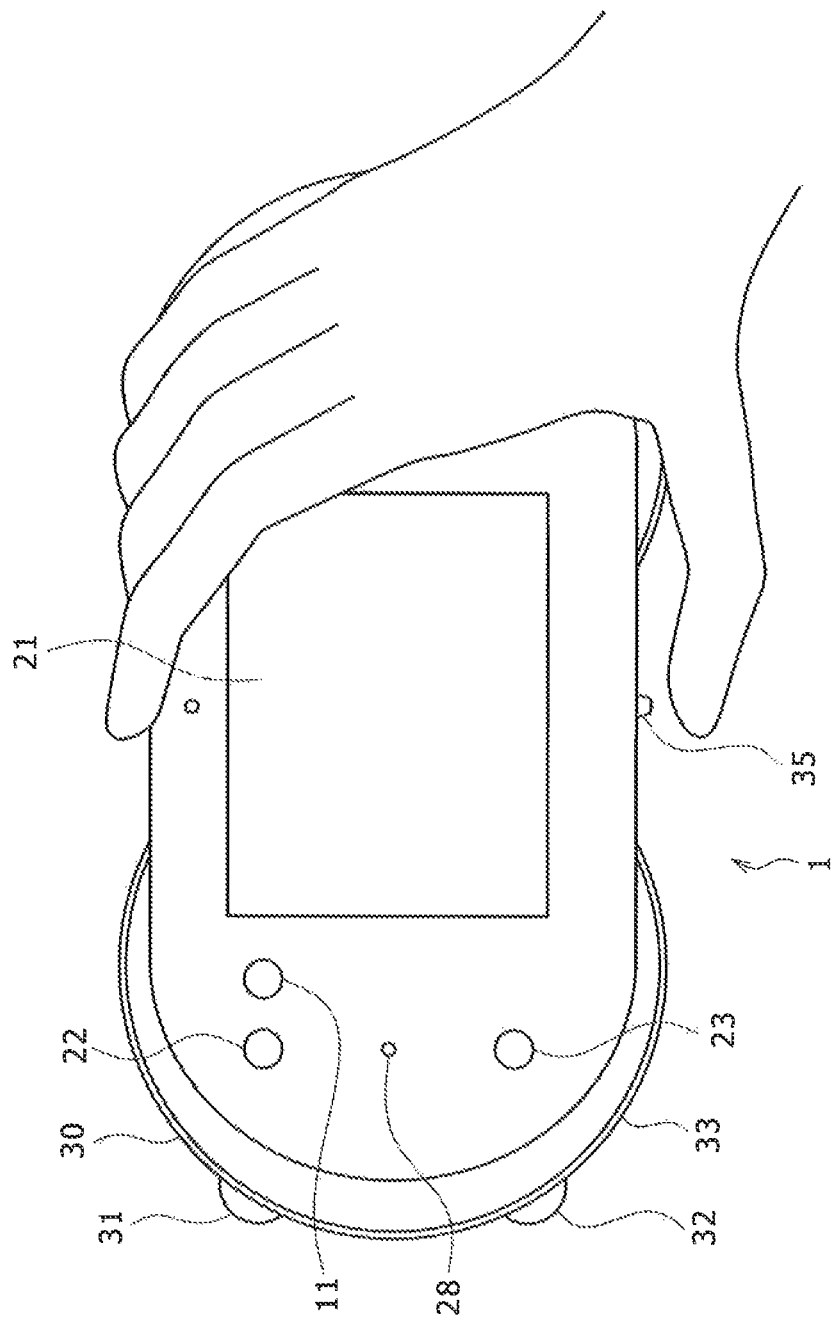
FIG. 9 is a schematic view showing the information communication terminal held by a user.

Since such various buttons are provided on the information communication terminal 1 as described above, when the user refers to information displayed on the display section 21 and operates the information communication terminal 1, the user can use, for example, its one hand as seen in FIG. 9 to operate the buttons. FIG. 9 illustrates a manner in which the music key 35 is operated by the thumb of the right hand of the user.

Figure 10:
FIG. 10 is a schematic view showing the information communication terminal held by the user but in a different manner.

On the other hand, where an IP telephone is used, the user would hold the information communication terminal 1 such that, as seen in FIG. 10, the positions of the speaker 28 and the microphone 29 correspond to one of the ears and the mouth of the user, respectively, and operate the buttons of the information communication terminal 1.

Figure 11:
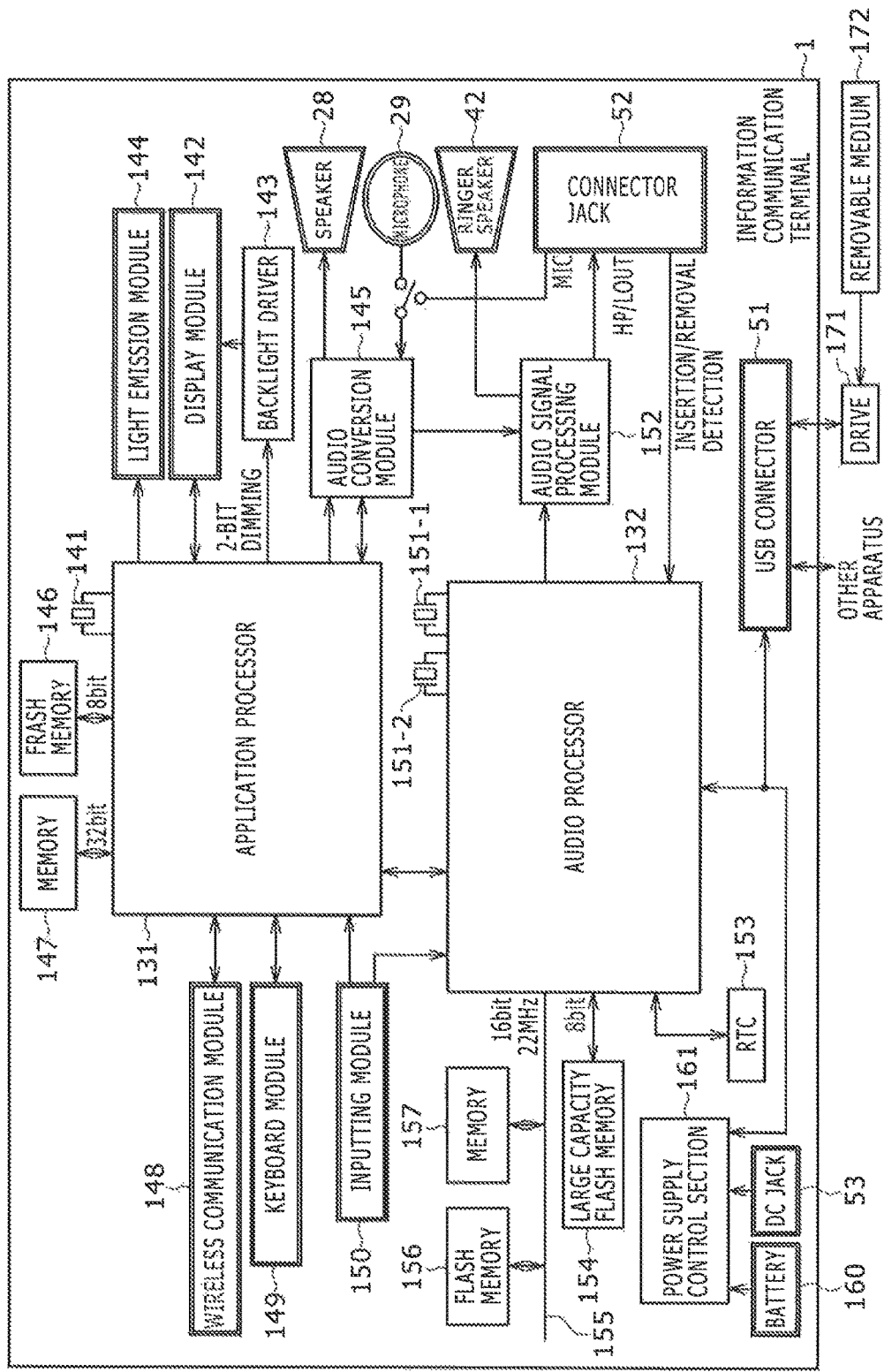
FIG. 11 is a block diagram showing an example of an internal configuration of the information communication terminal.

FIG. 11 shows an example of an internal configuration of the information communication terminal 1.

Referring to FIG. 11, the information communication terminal 1 includes an application processor 131 which takes charge of execution of an application program and so forth, and an audio processor 132 which takes charge of functions of management of sound data, audio codec, copyright management and so forth as principal components. The application processor 131 and the audio processor 132 are connected to each other by one or a plurality of serial interfaces or a parallel interface and communicate control signals and data therebetween.

The application processor 131 executes various processes based on a clock generated by a clock generation section 141. Details of functions executed by the application processor 131 are hereinafter described.

Connected to the application processor 131 are a display module 142, a backlight driver 143, a light emitting module 144, an audio conversion module 145, a flash memory 146, a memory 147, a wireless communication module 148, a keyboard module 149 and an inputting module 150. The inputting module 150 is connected also to the audio processor 132.

The display module 142 includes the display section 21. Where the display section 21 is formed from an LCD apparatus, the display module 142 further includes several components necessary for the display section 21 to display information such as an LCD driver, a backlight for the LCD apparatus, and as occasion demands, a light guiding pipe and so forth. The display module 142 displays various kinds of information under the control of the application processor 131.

The backlight driver 143 drives the backlight of the display section 21.

The light emitting module 144 includes the WLAN state indicating light emitting section 31, power supply state indicating light emitting section 32 and communication state indicating light emitting section 34, and drivers for light emitting elements included in the light emitting sections. The light emitting module 144 drives the WLAN state indicating light emitting section 31, power supply state indicating light emitting section 32 and communication state indicating light emitting section 34 to emit light, flicker or emit no light in a predetermined color under the control of the application processor 131.

The audio conversion module 145, for example, A/D converts sound collected by the microphone 29 or another microphone connected to the connector jack 52, performs a predetermined process such as filtering for a result of the A/D conversion and then supplies a result of the process to the application processor 131 under the control of the application processor 131. Further, the audio conversion module 145 D/A converts audio data supplied from the application processor 131 and outputs resulting sound data to the speaker 28 so as to be reproduced by the speaker 28. Or, the audio conversion module 145 outputs the sound data to headphones or the like connected to the connector jack 52 through an audio signal processing module 152 so as to be reproduced by the headphones or the like.

The flash memory 146 may be registers or the like which have a storage capacity of, for example, approximately 64 MB and to which programs to be executed by the application processor 131 and information and various variables necessary for execution of the programs are set. The flash memory 146 thus stores information which is not erased also after the power supply is stopped.

The memory 147 is formed, for example, from an SDRAM (Synchronous Dynamic Random Access Memory) and has a storage capacity of, for example, approximately 64 MB. The memory 147 stores information necessary for processes to be executed by the application processor 131.

The wireless communication module 148 is a unit for implementing functions of the WLAN conforming, for example, to the 802.11d standards. The wireless communication module 143 executes wireless communication to communicate information with another apparatus directly or through an access point, and a network under the control of the application processor 131.

The keyboard module 149 includes the keyboard 71, and receives an operation input of the user and supplies a signal representative of the substance of an operation to the application processor 131.

The inputting module 150 receives an operation input of the user from the INFO button 11, WLAN mode changeover button 22, HOME button 23, BACK button 24, option button 25, four-direction key 26, determination button 27, WLAN ON/OFF switch 30, power supply switch 33, music key 35, HOLD switch 43 or volume button 44. Then, the inputting module 150 supplies a signal representative of the substance of the operation to the application processor 131 or the audio processor 132.

The audio processor 132 executes various processes based on a clock generated by a clock generation section 151-1 or another clock generation section 151-2. Since the audio processor 132 principally treats audio data, it preferably receives two clock inputs including a basic clock to be used for a codec process of audio data and another basic clock to be used for other signal processes.

To the audio processor 132, the audio signal processing module 152, the USB connector 51, a real time clock (RTC) 153, a large capacity flash memory 154 and a memory bus 155 are connected in addition to the inputting module 150 described hereinabove. A flash memory 156 and a memory 157 are connected to the memory bus 155. Further, also an insertion/removal detection signal of the connector jack 52 is supplied to the audio processor 132.

The audio signal processing module 152 has, for example, a D/A converter, a digital filter, a sound outputting (headphones or speaker) amplifier and so forth built therein. The audio signal processing module 152 D/A converts sound data supplied thereto from the audio processor 132 or the audio conversion module 145, filters and amplifies resulting data of the D/A conversion as occasion demands, and supplies a result of the filtering to the ringer speaker 42 or the connector jack 52 so as to be reproduced and outputted. Further, the audio signal processing module 152 receives an instruction to output an audio signal or beep sound or ringing sound of an IP telephone set and cause the ringer speaker 42 or the connector jack 52 to output beep sound or ringing sound.

The real time clock (RTC) 153 counts and supplies the time at present to the audio signal processing module 152.

The large capacity flash memory 154 has a large storage capacity such as, for example, one to several GB and stores information supplied from the audio processor 132. It is to be noted that also information produced or acquired by a process of the application processor 131 and supplied through the audio processor 132 is stored into the large capacity flash memory 154.

In the large capacity flash memory 154, for example, content data such as music data which can be reproduced by a process of the audio processor 132 are stored. Also data produced by various application programs, for example, registration information of a different user to be used for communication of information with the different user using such a tool as, for example, an instant messenger, an IP telephone, chatting or an electronic mail, is stored in the large capacity flash memory 154. Also registration information relating to oneself (self apparatus or self user) which is sent to an apparatus owned by another user is stored in the large capacity flash memory 154 such that it can be set or changed suitably by the user.

The flash memory 156 has a storage capacity of, for example, approximately 64 MB and stores information which is not erased also after the power supply stops such as programs to be executed by the audio processor 132, registers to which information, various variables and so forth necessary for execution of the programs are set.

The memory 157 is formed, for example, from an SDRAM and has a storage capacity of approximately 64 MB. The memory 157 stores information necessary for a process executed by the audio processor 132.

To the USB connector 51, another apparatus such as the personal computer 4 is connected, for example, through a USB cable as described hereinabove with reference to FIG. 1. Further, a drive 171 is connected to the USB connector 51 as occasion demands, and a removable medium 172 such as a magnetic disc, an optical disc, a magneto-optical disc or a semiconductor memory is loaded suitably into the drive 171. A computer program read out from the removable medium 172 is installed for execution into the flash memory 146 or the flash memory 156 as occasion demands.

A signal supplied, for example, from the personal computer 4 is supplied through the USB connector 51 to the audio processor 132 and is supplied to the application processor 131 as occasion demands. Further, the audio processor 132 outputs a predetermined signal, for example, to the personal computer 4 through the USE connector 51.

DC power supplied through a USB connection, DC power supplied through the DC jack 53 or DC power supplied from a battery 160 accommodated in the information communication terminal 1, is supplied to the components of the information communication terminal 1 through a power supply control section 161.

Now, software to be executed by the application processor 131 is described. FIG. 12 shows a software stack and illustrates a configuration of software which is executed by the application processor 131.

Referring to FIG. 12, the configuration of the software to be executed by the application processor 131 defines a hardware layer, a device driver layer, an OS layer, a middleware layer and an application layer from the lower layer side.

The device driver layer is software for exclusive use for causing hardware connected to the application processor 131 to operate. The device driver layer particularly includes a device driver (WLAN) for causing the wireless communication module 148 to operate, and an LCD driver (LCD) for causing the LCD apparatus included in the display module 142 for causing the display section 21 to display an image. The device driver layer further includes a keyboard driver (KEY) for causing the keyboard module 149 to operate, and a device driver (GPIO) for causing a general purpose port of the application processor 131 to operate. The device driver layer further includes a driver (LED) for causing the light emitting elements included in the WLAN state indicating light emitting section 31, power supply state indicating light emitting section 32 and communication state indicating light emitting section 34 of the light emitting module 144 to operate, and so forth.

In the OS layer, an operating system (OS) for controlling basic operation of the application processor 131 is installed. The OS manages various resources which are operated by the respective drivers. In particular, the OS provides basic functions which are utilized commonly by many pieces of application software such as transmission of a command generated by any application program executed in the middleware layer or the application layer hereinafter described to a device driver, inputting or outputting of data to or from the flash memory 146, memory 147 or audio processor 132 and management of inputting and outputting functions such as key inputting and screen outputting to manage the entire system. As the OS, for example, Windows (registered trademark) 95 (trademark), Windows (registered trademark) 98 (trademark), Windows (registered trademark) NT (trademark), LINUX, and OS/2 (trademark) are available. The OS further performs management of some of software resources of an execution context of some application program executed by the application layer hereinafter described (or a register set, a main memory image, a file handle and so forth which are heino utilized by a certain application program) and so forth.

The middle layer is formed from middleware which is software which operates on the OS and provides particular functions at a higher rate than the OS to application software.

The middleware layer has an intermediate characteristic between the OS and the application software. Since it is inefficient to individually develop a function which is utilized commonly by many pieces of application software, functions (in most cases, basic functions) which are utilized commonly by many pieces of application software are provided as middleware.

Here, a communication engine, a VoIP (Voice over IP) engine, an instant messenger engine, a DRW (Digital Rights Management) protocol, a graphic library and so forth are prepared as the middleware. The communication engine provides basic functions of a communication application of an IP telephone and so forth. The VoIP engine provides basic functions of a technique for transmitting and receiving sound data using a TCP/IP network. The instant messenger engine provides basic functions of the instant messenger. The DRM protocol implements a function for applying encryption and so forth to digital data in order to protect the copyright of the data. The graphic library is a group of parts and so forth of GUIs to be displayed on the display section 21 upon execution of various application programs.

The graphic library is a group of functions and data having general-purpose properties and used in image processes of various application programs executed in the application layer. More particularly, several functions having general-purpose properties and used in image processes are collected like a library to standardize functions necessary for execution of software as independent files. Generally, the graphic library is loaded upon execution thereof separately from application programs and is distinguished from subroutines of application programs.

In the application layer which is the highest layer, various application programs are executed. In the information communication terminal 1, applications, utility tools, an application manager for managing the application software including the applications and the utility tools, and a development environment are prepared. The applications include, for example, a communication application, a web browser, a file exchange application, a personal computer connection application, an audio player, a music search application, a music streaming, an instant messenger, a sound recording tool, a photo viewer (Photo Viewer) and a text editor (Text Editor). The utility tools include a WLAN, a menu display tool, a setting tool, a status bar display tool and an PEP (Front end Processor).

The communication application utilizes the communication engine or the VoIP engine to provide communication with (a user who utilizes) another apparatus such as an IP telephone function or voice chatting.

The web browser is an application for accessing a Web page through a network in particular, the we browser implements a function of executing a function of downloading an HTML file, an image file, a music file or the like through a network, analyzing the layout of the downloaded file and displaying or reproducing the file. The web browser further implements another function of allowing the user to transmit data to a Web server using a display form and causing application software described in Java (registered trademark) Script, Flash or Java (registered trademark) to operate.

The file exchange application provides a file transfer function of transferring and receiving a data, file to and from another apparatus connected to the information communication terminal 1 directly or through a network. The personal computer connection application provides a function of establishing a connection to the personal computer 4 to communicate information with the personal computer 4.

The audio player provides a function of reproducing music data. The music search application uses music data stored in the inside thereof as a database and provides a function of searching for music data desired by the user. The music streaming provides a function of communicating music data with another apparatus to perform streaming reproduction.

The instant messenger application checks whether or not a party who utilizes the same software on a network such as the Internet or a LAN is online, and performs, if the party is online, chatting, file transfer or the like.

The sound recording tool provides a function of recording and reproducing sound data collected by the microphone 29 like a voice memo. The photo viewer manages image data (photograph data) recorded in the inside and controls reproduction display by various display methods such as, for example, table display or slideshow display of thumbnail images. The text editor provides a function of producing text data based on an operation input of the user by means of the keyboard 71 or the like.

Further, in addition to the individual applications, for example, also spreadsheet software, database production software, an electronic application and various games can be installed suitably as individual applications.

The WLAN implements a function of a WLAN, for example, conforming to the 802.11b standards. The menu display tool controls display of a menu screen or the like to be displayed on the display section 21. The setting tool is for setting various functions of the information communication terminal 1 in response to an operation input of the user. The status bar display tool is for displaying various kinds of information on a normal display panel hereinafter described. The FEP is kana-kanji conversion software used to input the Japanese language.

Now particular execution examples of various functions executed by the information communication terminal 1 are described with reference to display screens displayed on the display section 21.

Figure 13:
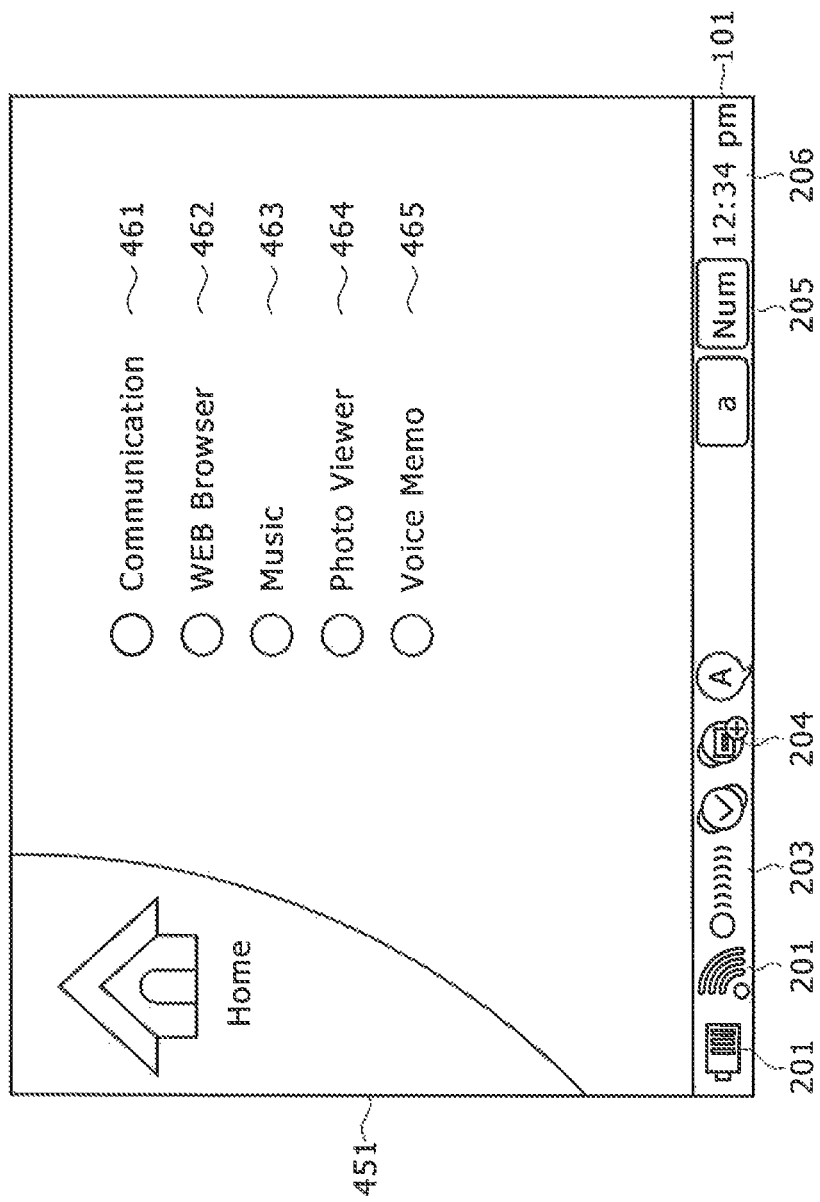
FIG. 13 is a schematic view showing an example of display of a HOME screen of the information communication terminal.

FIG. 13 shows an example of display of a HOME screen 451 which is displayed on the display section 21 of the information communication terminal 1, for example, immediately after the power supply is turned on or when the HOME button 23 is depressed.

Displayed on the HOME screen 451 is a menu for selecting an application program which can be executed by the information communication terminal 1 (or a menu of items constructed by a plurality of application programs.

On the HOME screen 451 of FIG. 13, a menu of a communication application (Communication) 461, a music tool (Music) 463, a web browser (WEB Browser) 462, a photo viewer (Photo Viewer) 464 and a sound recording tool (Voice Memo) 465 is displayed in a table wherein any of the menu items can be selected.

The user can basically utilize the HOME screen 451 to select and start a desired application to execute various functions.

In FIG. 13, a normal display panel 101 is displayed in addition to the table screen of the menu. The normal display panel 101 is displayed basically normally also on various screens hereinafter described in addition to the HOME screen 451.

The normal display panel 101 is described below.

The normal display panel 101 is provided, for example, as shown in FIG. 13, in a predetermined region along a lower side of the display section 21 and displays various kinds of information indicating states of the information communication terminal 1.

A battery remaining amount display area 201 is used to display information representative of the remaining capacity of the battery.

A WLAN radio wave intensity display area 202 is used to display information indicative of the intensity of the WLAN.

A WLAN state display area 203 is used to display information indicative of the mode and the connection state of the WLAN. In particular, the WLAN state display area 203 is used to display, for example, information of which one of an off state, an infrastructure mode and an ad hoc mode the WLAN mode is, information of which one of a connected state and an OFFLINE state the connection state is, and so forth.

A communication utilizing application state display area 204 is used to display information regarding an execution state of an application by which the infrastructure mode and the ad hoc mode of the WLAN are executed.

In particular, for example, if the IP telephone application is being executed in the infrastructure mode, then the execution state of the IP telephone application is displayed. However, if the instant messenger application is executed in the infrastructure mode, then the execution state of the instant messenger application is displayed.

On the other hand, if an application which utilizes an ad hoc connection is being executed in the ad hoc mode, then connection information of the ad hoc mode such as information representative of, for example, whether or not one-to-one communication is proceeding is displayed.

A keyboard input mode display area 205 is used to display an input mode of a special key (for example, ALT, NUM, SHIFT and Fn keys and so forth) on the keyboard. On the other hand, in a HOLD state of keys, a HOLD mark is displayed in the keyboard input mode display area 205.

A clock display area 206 is used to display present time information.

Now, a process when the communication application (Communication) 461, web browser (WEB Browser) 462 or music tool (Music) 463 is selected and determined on the HOME screen 451 of FIG. 13 is described.

First, a process when the communication application (Communication) 461 on the HOME screen 451 is selected and determined is described.

If the communication application (Communication) 461 is selected and determined, then such applications as the communication application including a function of an IP telephone and so forth, the instant messenger and the electronic mail application as applications which make use of a communication process of the WLAN infrastructure mode to perform a process can be started. Then, the information communication terminal 1 cart communicate information with the server 3, the personal computer 4 or another information communication terminal 1 through the network 2 by wireless communication based on the started applications.

Figure 14:
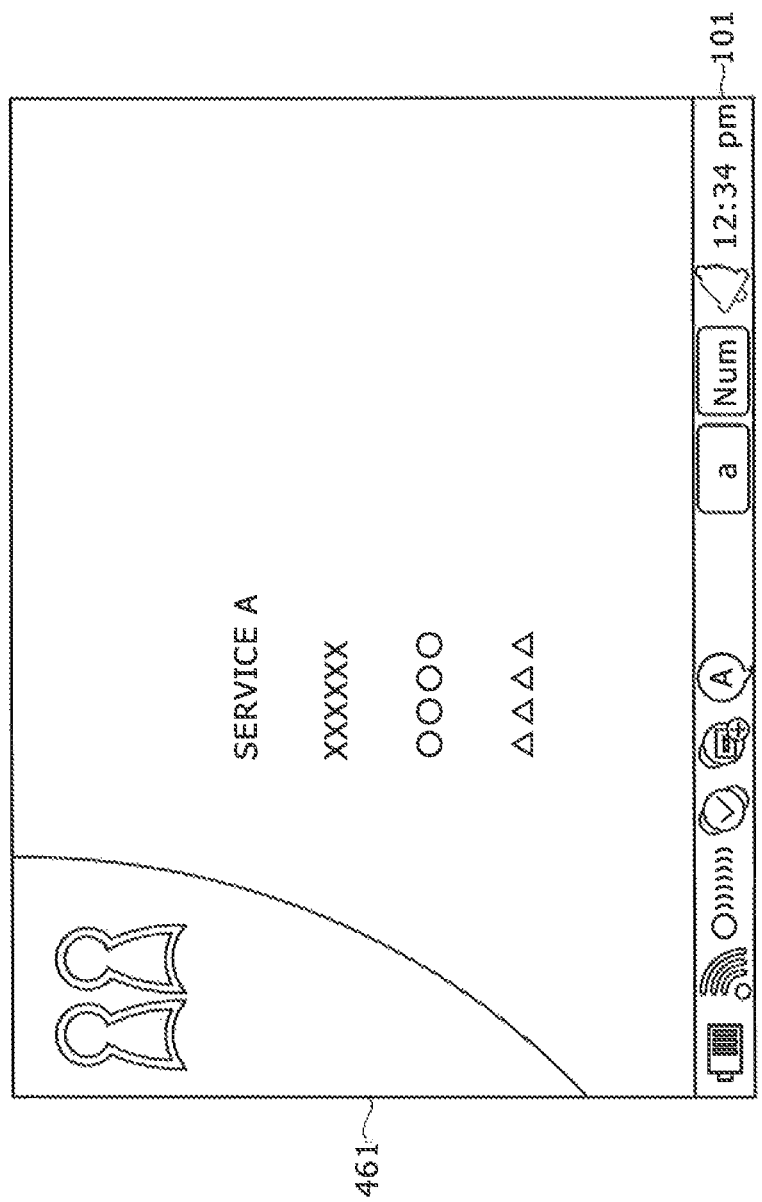
FIG. 14 a schematic view showing a communication application top screen of the information communication terminal.

FIG. 14 shows a communication application top screen 461 displayed when the communication application (Communication) 461 is selected and determined on the HOME screen 451 of FIG. 13. On the communication application top screen 461, tool names and so forth of communication tools, which can be utilized in the WLAN infrastructure mode, provided by a plurality of service undertakers (service providers) are displayed in a table.

Services of communication tools for an IP telephone or chatting in which a wide area network such as the Internet is utilized are provided by a plurality of service undertakers (service providers). The information communication terminal 1 can utilize such communication tools provided by a plurality of service undertakers (service providers) as communication applications.

Figure 15:
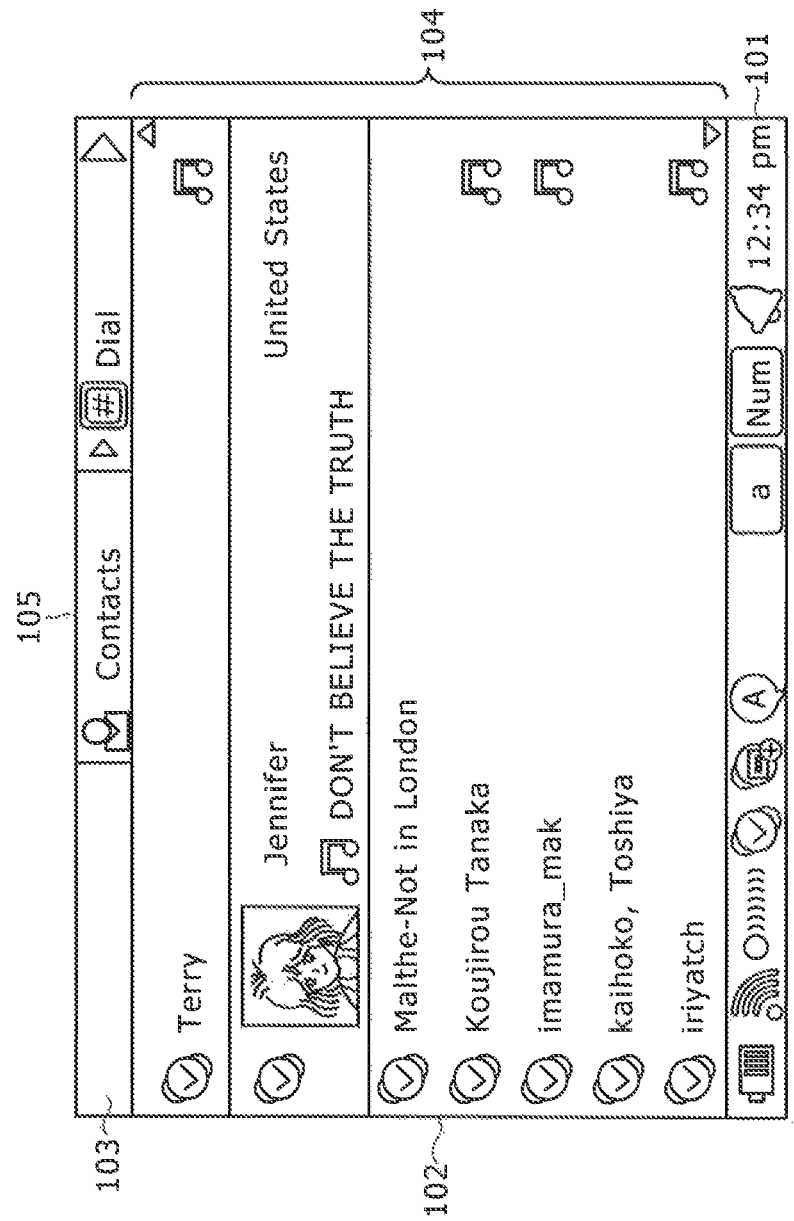
FIG. 15 is a schematic view showing a contact list display screen of the information communication terminal.

If one of the tool names of the communication tools on the communication application top screen 461 of FIG. 14 is selected and determined, then, for example, such a contact list display screen 102 as shown in FIG. 15 is displayed.

In a content tab display area 103 of the contact list display screen 102, a plurality of tabs are displayed so that the user can select information display in a list display area 104 or issue an instruction for various operations. The user can use the left or right key of the four-direction key 26 to select a desired one of the tabs and determine the selected tab using the determination button 27.

The selected and determined tab is displayed in a selected tab display area 105 at the center.

One of the tabs displayed in the content tab display area 103 is a Contact List tab for causing, for example, a list of registered users, with whom the information communication terminal 1 can communicate, to be displayed. If the Contact List tab is selected, then such a table of the communicable registration users as shown in FIG. 15 is displayed in the list display area 104.

The user can use the four-direction key 26 to select a desired registered user and communicate with the selected user making use of a corresponding communication tool such as an IP telephone, chatting or an electronic mail.

It is to be noted that the tabs displayed in the content tab display area 103 further include a Dial tab for causing a list of communicable registered users or telephone numbers to be displayed and allowing the user to perform an operation input for a process of originating an IP telephone call to the selectively determined opposite party. The tabs further include a Call tab for performing a setting process of a Calling screen, and a Chat tab for causing a text input area, into which a test is to be inputted for chatting, and a display area for the text inputted by the opposite party of chatting to be displayed. The tabs further include a Call List tab for causing an originating and terminating call history to be displayed, a Setting tab for causing a setting screen for performing various settings to be displayed, and a Start tab for causing a status and so forth of the information communication terminal 1 itself to be displayed.

Now, a process when the web browser (WEB Browser) 462 is selected and determined on the HOME screen 451 of FIG. 13 is described.

If the web browser (WEB Browser) 462 is selected and determined, then the web browser as an application for performing a process utilizing a communication process of the WLAN infrastructure mode can be utilized.

Figure 16:
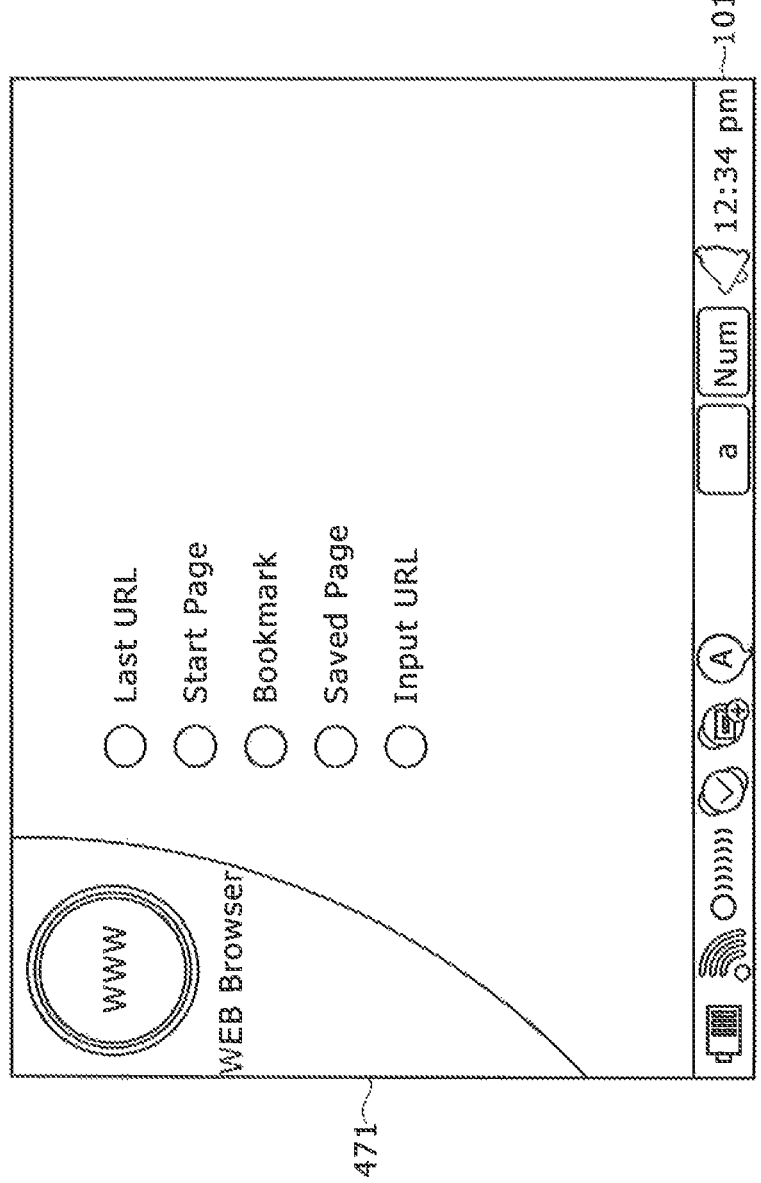
FIG. 16 is a schematic view showing a web browser menu screen of the information communication terminal.

FIG. 16 shows an example of display of a web browser menu screen 471 which is displayed on the display section 21 when the web browser (WEB Browser) 462 is selected and determined on the HOME screen 451 of FIG. 13. The web browser menu screen 471 displays a menu for selecting a designation method of a web page to be displayed.

In the case of the example shown in FIG. 16, the following methods are available as a designation method of a web page to be displayed. For example, according to one of the methods, a web page connected last is displayed (Last UPI). According to another method, a page registered in advance as a web page to be displayed first is displayed (Start Page). According to a further method, a table of web pages registered as favorite web pages in advance is displayed and one of the web pages selected and determined by the user is displayed (Bookmark). According to a still further method, data itself of a page is stored in advance and the stored page is displayed (Saved Page). According to a yet further method, the user is urged to input a URL of a desired web page (Input URL).

Figure 17:
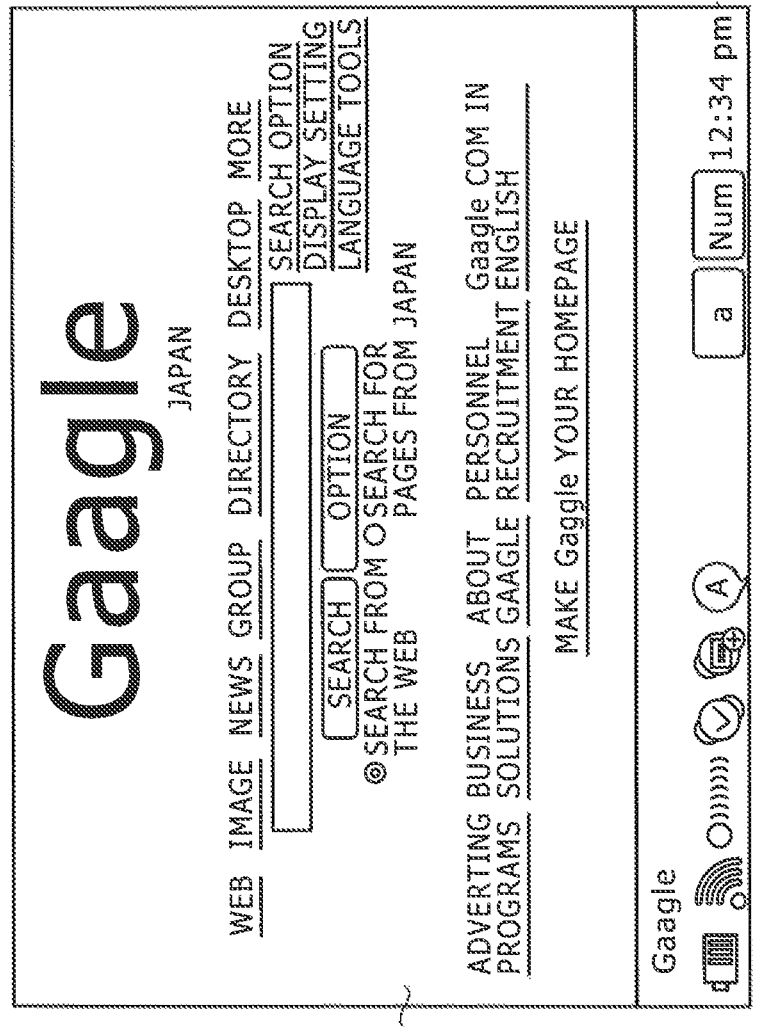
FIG. 17 is a schematic view showing a connection screen of the information communication terminal.

If one of the web page designation methods is selected and determined on the web browser menu screen 471 and the web page to be connected is settled, then connection to the page (accessing to the server 3 by which the page is laid open on the network 2 such as the Internet) is performed. Then, when a connection to the web page of the designated GEL is established, the web page is displayed on a web page display screen 472 as seen in FIG. 17.

Now, a process when the music tool (Music) 463 is selected and determined on the HOME screen 451 of FIG. 13 is described.

If the music tool (Music) 463 is selected and determined, then a process which treats sound data (principally music data) can be performed.

Figure 18:
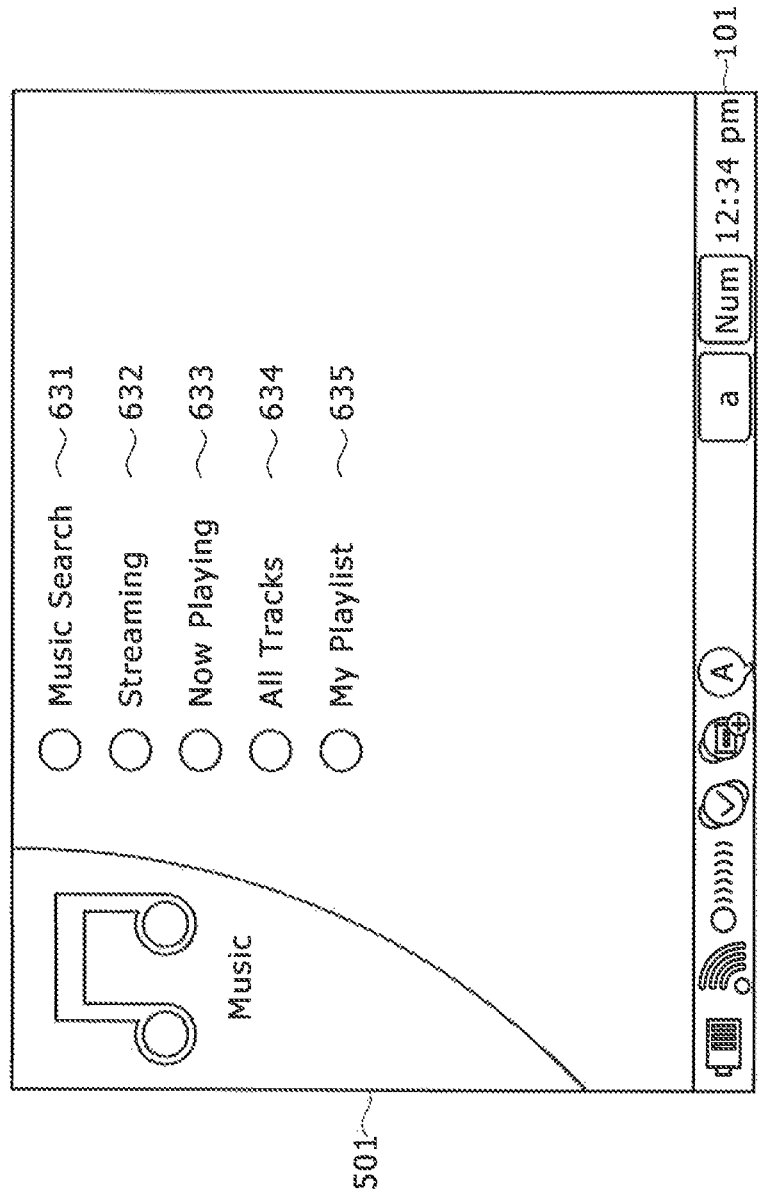
FIG. 18 is a schematic view showing a menu screen of the information communication terminal.

FIG. 18 shows an example of display of a menu screen 501 displayed on the display section 21 when the music tool (Music) 463 is selected and displayed on the HOME screen 451 of FIG. 13.

In the example illustrated in FIG. 18, the user can select and determine any of menu items of a Music Search 631, a Streaming 632, a Now Playing 633, an All Tracks 534 and a My Playlist 635 using the four-direction key 26 and the determination button 27.

Functions relating to music contents are classified into those functions which do not utilize a communication process with another apparatus and those functions which utilize a communication process with another apparatus. However, where a menu screen which displays those functions which handle music contents in this manner is prepared, the user can utilize a plurality of application programs which handle music contents without intentionally distinguishing them particularly.

Communication methods with another apparatus utilize a wire connection which uses a USS or a wireless connection which uses the WLAN. Further, the wireless communication which uses the WLAN includes the ad hoc mode and the infrastructure mode as described hereinabove.

Here, a process when each menu item of the menu screen 501 of FIG. 18 is selected and determined is described.

Figure 19:
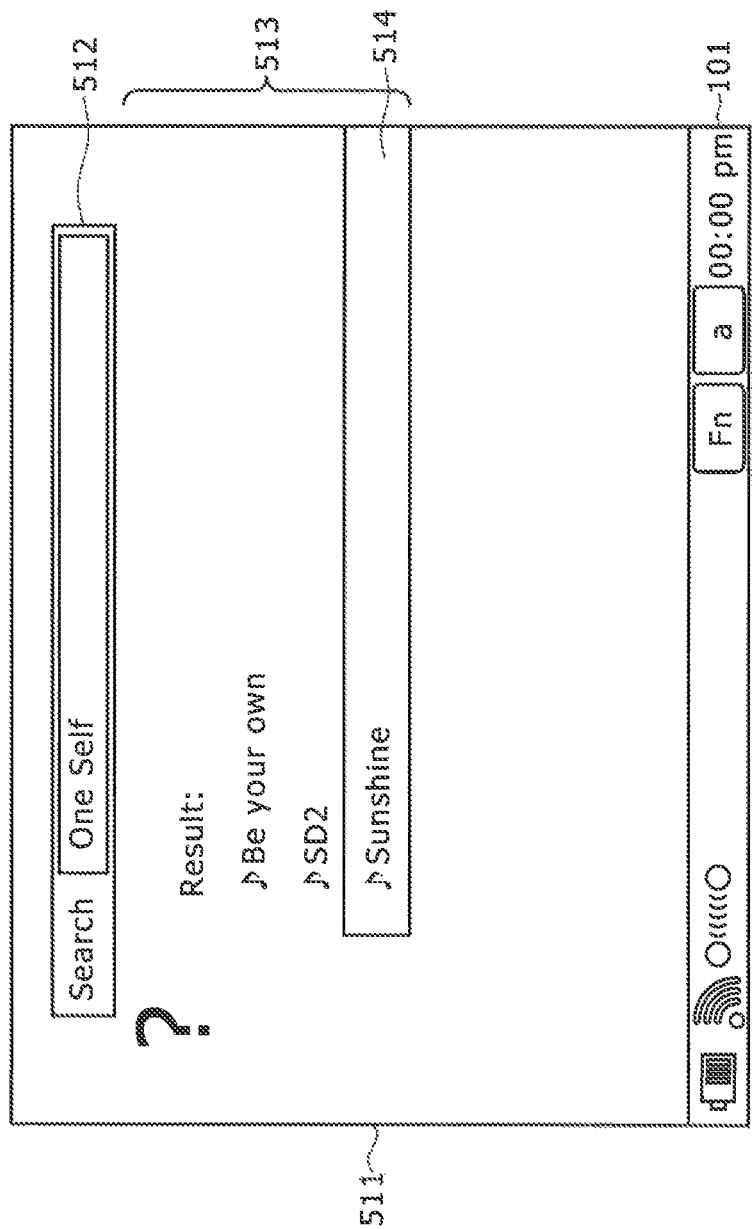
FIG. 19 is a schematic view showing a search screen of the information communication terminal.

If the Music Search 631 is selected on the menu screen 501 of FIG. 18, then the music search application of the application layer illustrated in FIG. 12 is started, and a search screen 511 is displayed as seen in FIG. 19. Thus, the user can select music data by inputting a predetermined search key to a text inputting section 512.

If the user inputs a desired search key to the text inputting section 512 and depresses the determination button 27, then the music search application started in the application processor 131 supplies the search key supplied from the keyboard module 149 to the audio processor 132.

The audio processor 132 uses the function of the music PB to search the titles, album names and artist names for those which include the search key supplied thereto. Then, the audio processor 132 supplies a result of the search (for example, music piece names) to the application processor 131.

The music search application operating in the application processor 131 causes a search result display area 513 of the search screen 511 to display the search result (for example, music piece names) as seen in FIG. 19.

If the user uses the four-direction key 26 to move a cursor 514 to one of items of the search result (for example, music piece name) in the search result display area 513 of the search screen 511 and use the determination button 27 to select and determine the search result item (for example, music piece name) selected by the cursor 514, then the application processor 131 starts the audio player illustrated in FIG. 12. Further, as occasion demands, the application processor 131 controls the audio processor 132 so that the music data selected and determined by the user is reproduced and outputted. In other words, the audio processor 132 uses the function of the audio player to start a reproduction process of the selected and determined music data.

Figure 20:
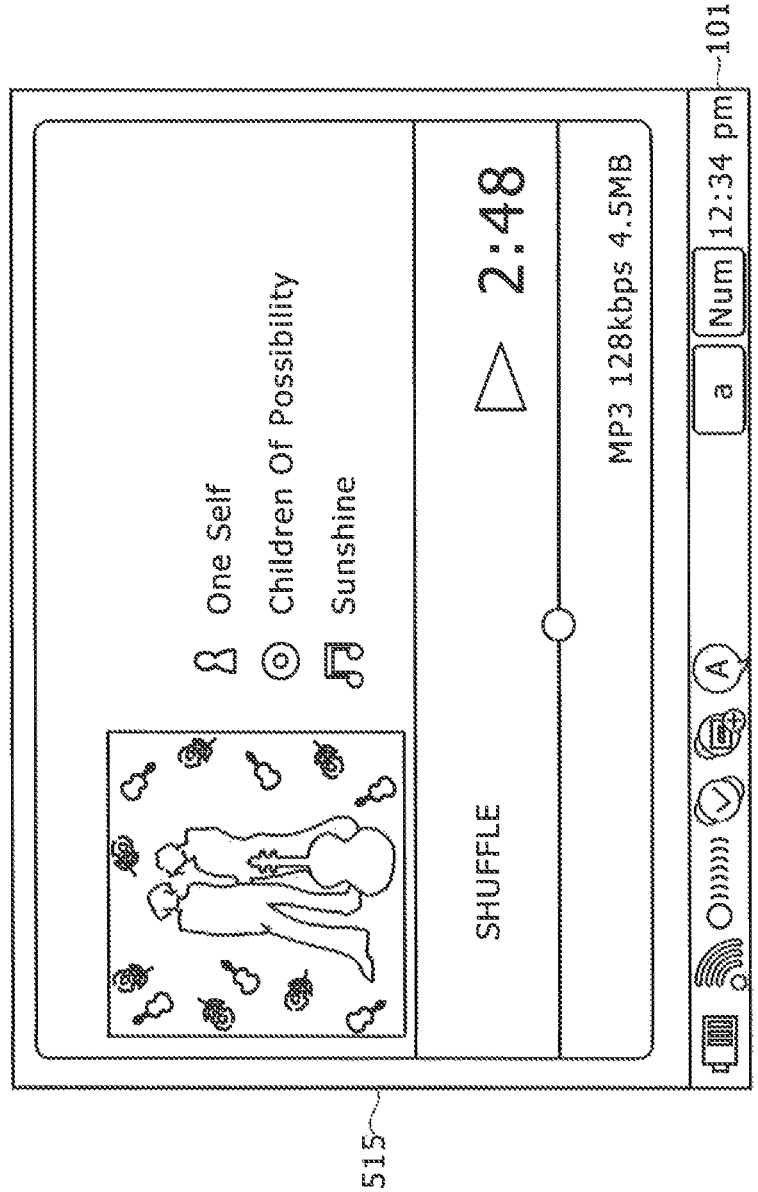
FIG. 20 is a schematic view showing a music data reproduction display screen of the information communication terminal.

FIG. 20 shows a music data reproduction display screen 515 displayed on the display section 21 of the information communication terminal 1 on which music data are being reproduced. On the music data reproduction display screen 515, for example, information regarding the content such as, for example, the title name, the artist name, the album name or a thumbnail image of a jacket of the album is displayed.

Referring back to FIG. 18, if the Streaming 632 is selected and determined on the menu screen 501 in a state wherein the WLAN ad hoc mode is on, then the music streaming illustrated in FIG. 12 is started to start streaming.

Here, communication in the ad hoc mode is described with reference to FIGS. 21 to 23.

Referring to first to FIG. 21, each of information communication terminals 1-1 to 1-5 which are owned by users A to E, respectively, and positioned within a range within which ad hoc communication is possible transmits information by broadcast transmission, that is, to all apparatus within the communication range without determining a particular transmission destination. The information in this instance includes information unique to the self apparatus (that is, the information communication terminal 1) and basically unchanged, and information relating to the situation of the self apparatus (that is, the information communication terminal 1) at present and different depending upon the time. An example of the information transmitted from the information communication terminal 1 by broadcast transmission is illustrated in FIG. 22.

The information communication terminal 1 in the ad hoc mode broadcasts the IP address and the port number of the self station, the ID unique to the terminal, the User ID with a profile set, connection permission/inhibition information such as Busy or Ready or the like, information of a music piece (Now-playing music piece) being currently played such as the music piece name and artist name. The information communication terminal 1 further broadcasts information necessary for streaming reproduction of music data where the music data are protected by copyright such as the Sequence Number of the music piece being reproduced+ Object Handle, other information of the reproduction state and so forth, and information such as a text memo inputted by the user.

Among the various kinds of information, the IP address and the port number of the self station, the ID unique to the terminal and the User ID with a profile set are information which basically is not changed. Meanwhile, the (Now-playing music piece) information of a music piece being currently played, the information necessary for streaming reproduction of music data where the music data being reproduced are protected by copyright and other information of the reproduction state and so forth are information which varies depending upon the time. Further, the information such as a text memo inputted by the user is information which basically is not changed but can be changed when the user changes the registration substance.

Each of the information communication terminals 1-1 to 1-5 owned by the users A to E in FIG. 21 acquires the information illustrated in FIG. 22 from the other apparatus and recognizes whether or not each of the information communication terminal 1 is an apparatus owned by a user registered as a communication party in the ad hoc mode. Each of the information communication terminals 1-1 to 1-5 further recognizes a communication situation with the other information communication terminal 1 owned by the users registered as a communication party in the ad hoc mode, and information relating to the users of the other information processing terminals 1 which exist within a range within which ad hoc communication is possible but are not registered.

In order to make it possible to perform file transfer or streaming of music data like the information communication terminal 1-4 and the information communication terminal 1-5 in FIG. 21, it is necessary for them to register the opposite party side apparatus between each other.

For example, if a registration request is received from an unregistered user, then such information as illustrated in FIG. 23 is communicated with and registered into each other between and as the communication parties.

In the example of FIG. 23, the information preferably includes the ID unique to the apparatus, the User ID with a profile set, text data inputted for registration by the user such as, for example, the URL of the homepage and self-introducing writings of the user itself, image data to be utilized as a face icon (which naturally may not be photograph data of the actual face of the user) to be displayed on a standby display screen or the like. The information preferably further includes user color information set by the user as a display color of the wallpaper of the display section 21 during a communication process with the user, an ID to be utilized in a communication application (for example, a tool such as chatting, an IP telephone or the like), and the ID of the instant messenger.

It is to be noted that, also between the information processing terminals 1 owned by unregistered users, it is possible for each of the information processing terminals 1 to transmit a message to the other information communication terminal 1 where it exists within a range within which communication is possible. The wireless communication module 148 of any information communication terminal 1 transmits, for example, to the information communication terminal 1 of the opposite party side, a message for urging the information communication terminal 1 of the opposite party to carry out user registration between each other. Then, after acknowledge by them, such information as illustrated in FIG. 23 is communicated between them. Then, each of the information communication terminal 1 receives the information and supplies the received information to the application processor 131. The application processor 131 supplies the received information to the flash memory 146 connected to the application processor 131 or the flash memory 156 or the large capacity flash memory 154 connected to the audio processor 132. Consequently, the received information is registered as information relating to the information communication terminal 1 owned by the user who is registered as a communication party with which file exchange, streaming and so forth can be executed in the ad hoc mode.

The information processing terminals 1 each of which is registered as a communication party with which file exchange, streaming and so forth can be executed in the ad hoc mode can communicate with each other in one-to-one communication without fail to execute file exchange or streaming reproduction like the information communication terminals 1-4 and 1-5 shown in FIG. 21.

Communication in the ad hoc mode is performed in such a manner as described above.

Figure 24:
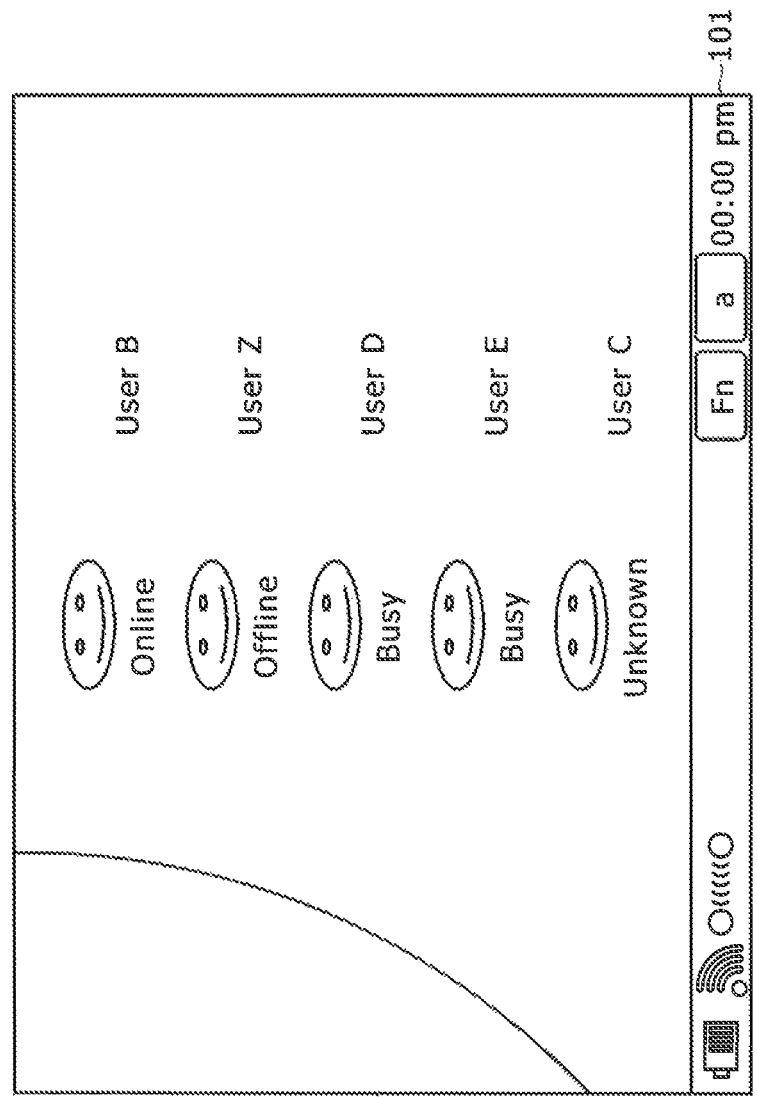
FIG. 24 is a schematic view showing an ad hoc user table screen of the information communication terminal.

FIG. 24 shows an example of an ad hoc user table display screen 521 displayed when the Streaming 632 is selected and determined on the menu screen 501 of FIG. 18 in a state wherein the WLAN ad hoc mode is ON.

On the ad hoc user table display screen 521, a communication situation with another information communication terminal 1 owned by a user registered as a communication party in the ad hoc mode is displayed. Specifically, the communication situation is displayed in regard to whether it is in an "Online state" which is a state wherein communication is possible, in an "Offline state" which is a state wherein communication is not possible because the user is not at the site, or in a "Busy state" which is a state wherein communication is not possible because the information communication terminal 1 is communicating with a different apparatus. Further, on the ad hoc user table display screen 521, an "Unknown state" is displayed as a state of a different information communication terminal 1 which exists within a range within which ad hoc communication is possible but is not registered.

In particular, FIG. 24 shows an example of display of the ad hoc user table display screen 521 of the user A in the example of FIG. 21 where the users B, Z, D and F are registered as communication parties of the user A.

Then, the ad hoc user table display screen 521 displays information representing that the user B is in an Online state; the user Z is an Offline state; the user D is communicating with another apparatus and is in a busy state; that the user E is communicating with another apparatus and is in a busy state; and the user C who is not registered exists within a range within which ad hoc communication is possible.

For example, if the "User B" in the Online state is selected and determined on the ad hoc user table display screen 521 of FIG. 24, then a streaming connection to the information communication terminal 1 used by the "User B" in the Online state is established, and an open playlist whose opening by broadcasting is permitted is list of at least part of pieces of music owned in the inside) is communicated. Then, based on the open playlist of the user B received from the information communication terminal 1 of the user B and the Now Playing information from within the broadcast information, such an open Playlist table display screen 531 which is a table of a piece of music being currently reproduced by the user B (that is, a Now Playing piece of music) and the open Playlist as shown in FIG. 25 is displayed.

Figure 25:
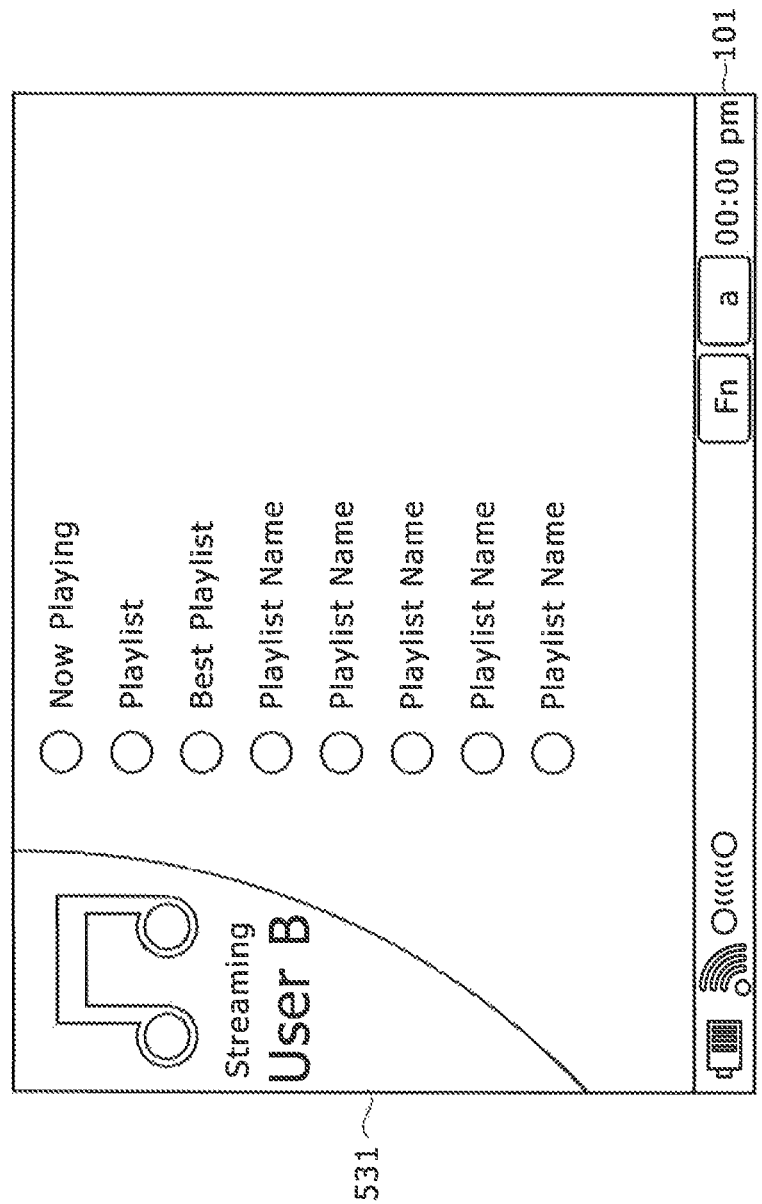
FIG. 25 is a schematic view showing a laid-open Playlist table display screen of the information communication terminal.
Figure 26:
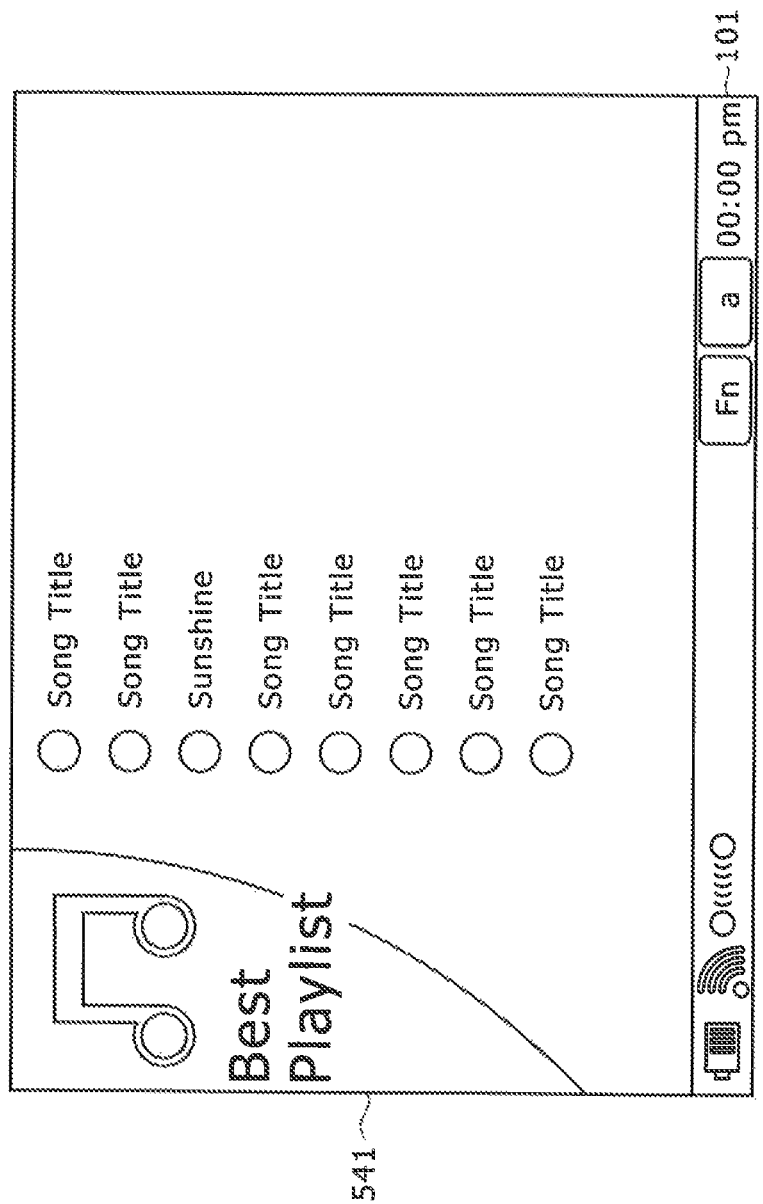
FIG. 26 is a schematic view showing a track display screen of the information communication terminal.

Then, for example, if a playlist desired by the user is selected and determined on the open Playlist table display screen 531 of the user B of FIG. 25, then a track display screen 541 which displays music data included in the selected and determined playlist, or in other words, a table of music tracks, is displayed as seen in FIG. 26. The user can select and determine a desired one of the music tracks displayed on the track display screen 541 to receive and reproduce streaming of the selected and determined music data from the user B.

In particular, the music stream application executed by the application processor 131 of the information, communication terminal 1-1 receives a signal indicative of an operation input of the user from the inputting module 150, and controls the wireless communication module 148 to supply the playlist selected and determined by the user and information for the designation of music data to the information communication terminal 1-2 owned by the user B.

Thereupon, a connection permission request from the user A may be or may not be displayed on the display section 21 of the information communication terminal 1-2 owned by the user B.

The music stream application executed by the application processor 131 of the information communication terminal 1-2 supplies the playlist selected and determined by the user and the information for the designation of the music data supplied from the information communication terminal 1-1 to the audio processor 132 through the wireless communication module 148. The audio processor 132 reads out music data (stream data) managed by the music DB from the large capacity flash memory 154 and supplies the music data to the application processor 131. Then, the audio processor 132 controls the wireless communication module 148 to transmit the music data to the information communication terminal 1-1.

Then, the music stream application executed by the application processor 131 of the information communication terminal 1-1 supplies the music data (stream data) supplied from the information communication terminal 1-2 through the wireless communication module 148 to the audio signal processing module 152. Then, the music stream application uses the audio codec function to control the audio signal processing module 152 to perform a decoding process and a DA conversion process for the music data. Then, the thus processed music data are reproduced and outputted from the connector jack 52 or reproduced and outputted from headphones or the like connected to the connector jack 52.

At this time, the music data reproduction display screen 515 shown in FIG. 20 is displayed on the display section 21 of the information communication terminal 1-1 on which stream reproduction is proceeding. The music data reproduction display screen 515 may display, in addition to information relating to the content such as, for example, the title name, artist name, album name and thumbnail image of the jacket of the album or the like, information relating to the supplying source (here, the user B) of the streaming data and other information.

Referring back to FIG. 24, if a user who is an unregistered user like the user C to the user A is selected and determined on the ad hoc user table display screen 521, then a dialog in which a message for the confirmation that a registration process should be carried out with the unregistered user is displayed. If the user accepts this, then a registration mode is entered. In the registration mode, such information as illustrated in FIG. 23 is communicated between and registered into the two information communication terminal 1.

A communication process where the Streaming 632 is selected and determined on the menu screen 501 of FIG. 18 is performed in such a manner as described above.

If the Now Playing 633 is selected on the menu screen 501 of FIG. 18, then the application processor 131 starts the audio player illustrated in FIG. 12 and, as occasion demands, controls the audio processor 132 to reproduce and output music data desired by the user. In particular, the audio processor 132 uses the function of the audio player to start a reproduction process of the selected and determined music data.

The audio processor 132 uses the function of the music DB to produce a table of music data stored in the large capacity flash memory 154 or information representative of the file structure (which may be an actual file structure or a virtual file structure) of the music data and supply the produced table or information to the application processor 131. The application processor 131 utilises the graphics library to display the table of the music data recorded in the large capacity flash memory 154 or the information representative of the file structure on the display section 21. The user would refer to the data displayed on the display section 21 and perform an operation input for selecting and determining desired music data.

The audio processor 132 reads out the music data selected and determined from within the music data managed by the music DB from the large capacity flash memory 154 and supplies the music data to the audio signal processing module 152. Then, the audio processor 132 uses the function of the audio codec to control the audio signal processing module 152 to perform a decoding process and a GA conversion process for the music data and reproduce and output the music data from the ringer speaker 42 or reproduce and output the music data from headphones or the like connected to the connector jack 52.

Upon reproduction of the music data, a music data reproduction display screen 515 similar to that described hereinabove with reference to FIG. 20 is displayed.

Referring back to FIG. 18, if the All Tracks 634 is selected on the menu screen 501, then a table of all tracks recorded in the large capacity flash memory 154 is displayed on the display section 21.

If the My Playlist 635 is selected on the menu screen 501 of FIG. 18, then a list of contents of music data, and so forth produced based on an operation input of the user is displayed.

Where any of the menu items of the menu screen 501 of FIG. 18 is selected and determined, a predetermined process is executed in this manner.

The predetermined processes when the communication application (Communication) 461, web browser (WEB Browser) 462 and music tool (Music) 463 are selected and determined on the HOME screen 451 of FIG. 13 are executed in such a manner as described above.

Now, particular examples of a shortcut to a function being executed on the background when such one or a plurality of applications as described above are operating and a plurality of functions are being executed simultaneously are described.

For example, it is assumed that both of the audio player and the instant messenger in the infrastructure of the WEAN are operating and the communication function by the instant messenger and the reproduction function by the audio player are being executed simultaneously. Also it is assumed that the HOME screen 451 shown in FIG. 13 is displayed on the display section 21.

In this instance, if the INFO button 11 is operated once by the user, then an INFO panel (hereinafter referred to as IM communication INFO panel) 801-1A including information according to the communication state of the communication function of the instant messenger at this time is displayed in a superposed relationship on the HOME screen 451 as indicated by an arrow mark A of FIG. 27.

If the INFO button 11 is depressed once again in the state wherein the IM communication INFO panel 801-1A is displayed in a superposed relationship on the HOME screen 451 in this manner, then another INFO panel (hereinafter referred to as reproduction INFO panel) 801-2 including information relating to the piece of music being currently reproduced is displayed in a superposed relationship in place of the IM communication INFO panel 801-1A as indicated by an arrow mark B.

Now, it is assumed that, for example, the music streaming in the ad hoc mode of the WLAN is operating and the communication function by the ad hoc mode and the streaming reproduction function are being executed simultaneously. Also it is assumed that the HOME screen 451 shown in FIG. 13 is displayed on the display section 21.

At this time, if the INFO button 11 is depressed once by the user, then an INFO panel (hereinafter referred to as ad hoc mode communication INFO panel) 801-1B for the ad hock mode including information according to the communication state of the communication function by the ad hoc mode at this time is displayed in a superposed relationship on the HOME screen 451 as indicated by an arrow mark C in FIG. 27.

Then, if the INFO button 11 is depressed once again in the state wherein the ad hoc mode communication INFO panel 801-1B is displayed in a superposed relationship on the HOME screen 451 in this manner, then the reproduction INFO panel 801-2 including information relating to the piece of music being stream reproduced is displayed in a superposed relationship in place of the ad hoc mode communication INFO panel 801-1B as indicated by an arrow mark D.

It is to be noted that, if the INFO button 11 is depressed once again when, for example, the audio player is operating and only the reproduction function is being executed, then an INFO panel 801-1C indicating that the WLAN is off is displayed as indicated by an arrow mark E.

Also in this instance, if the INFO button 11 is depressed once again, then the reproduction INFO panel 801-2 representing information relating to the piece of music being reproduced is displayed in a superposed relationship in place of the INFO panel 801-1C.

Where there is no necessity to individually distinguish the IM communication INFO panel 801-1A, ad hoc mode communication INFO panel 801-1B and INFO panel 801-1C from one another, each of them is referred to as communication INFO panel 801-1, and where there is no necessity to individually distinguish any communication INFO panel 801-1 and the reproduction INFO panel 801-2 from each other, each of them is referred to as INFO panel 801. Thus, if the INFO button 11 or the BACK button 24 is operated after the reproduction INFO panel 801-2 is displayed in place of any communication INFO panel 801-1, then a no-displaying state of any INFO panel 801 is restored, that is, the INFO panel 801 is erased, as indicated by an arrow mark G.

On the other hand, if the BACK button 24 is operated in a state wherein a communication INFO panel 801-1 is displayed, then the preceding state, that is, the no-displaying state of any INFO panel 801 is restored as indicated by an arrow mark H, I or J.

While a communication INFO panel 801-1 or the reproduction INFO panel 801-2 is displayed in this manner if the INFO button 11 is depressed, an input from an inputting device such as the four-direction key 26 is allocated simultaneously to a function of the destination of the change.

When the INFO panel 801 is not displayed, an input, for example, from the four-direction key 26 is allocated to the menu selection process of the HOME screen 451, and a predetermined menu item is selected and determined in response to the input. However, when the INFO button 11 is depressed once and a communication INFO panel 801-1 is displayed, an input from a predetermined inputting device is allocated to an operation on the communication INFO panel 801-1, that is, to the communication function. Therefore, the communication function is controlled in response to an input, for example, from the four-direction key 26.

Further, when the INFO button 11 is depressed and the reproduction INFO panel 801-2 is displayed, an input from a predetermined inputting device is allocated to an operation on the reproduction INFO panel 801-2, that is, to the reproduction function. Therefore, the reproduction process is controlled in response to an input, for example, from the four-direction key 26.

Figure 27:
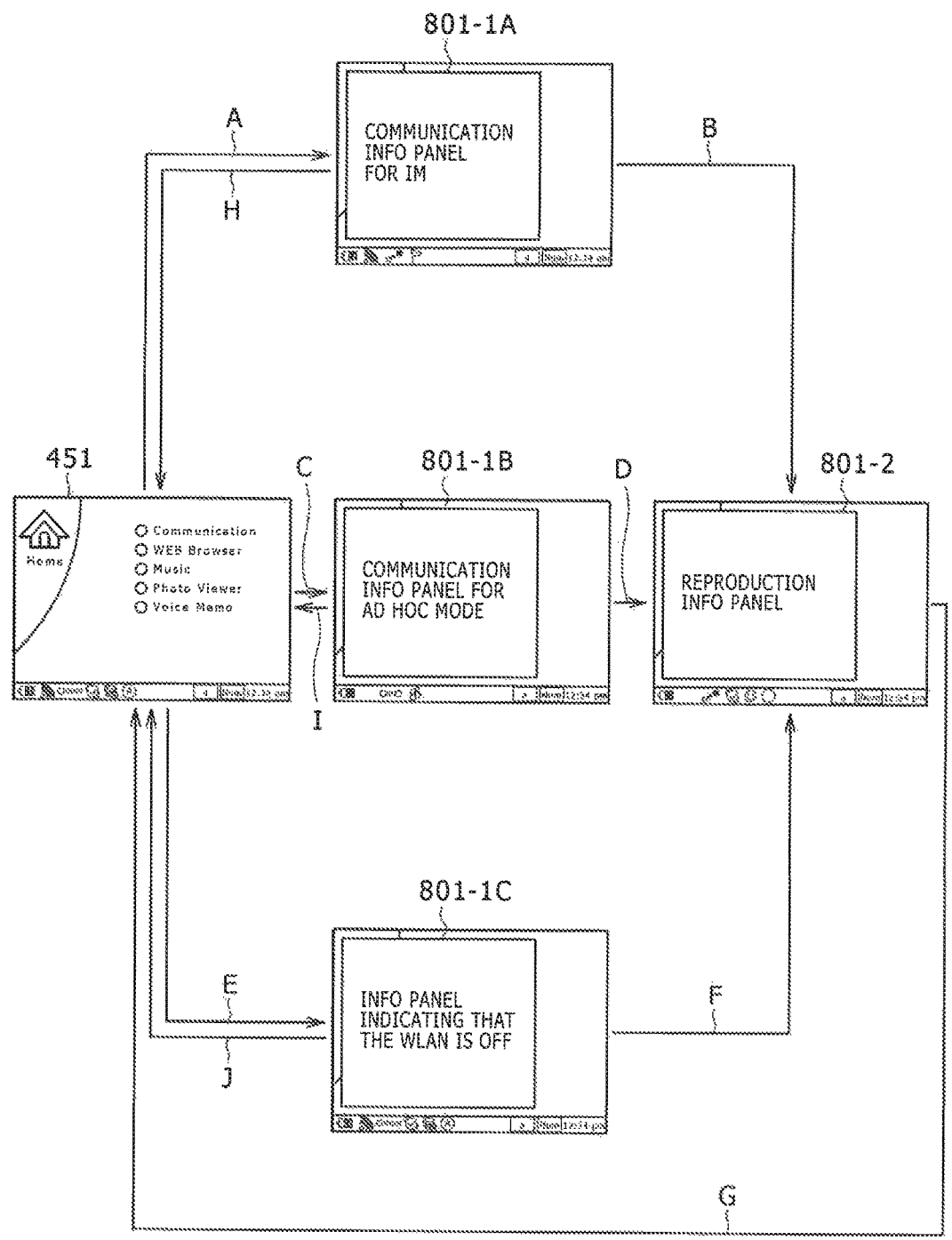
FIG. 27 is a flow diagram illustrating an outline of a shortcut process of the information communication terminal.

Any INFO panel 801 displayed in the example of FIG. 27 may be erased automatically if operation of any of the INFO button 11 and so forth is performed within a predetermined interval of time.

Figure 28:
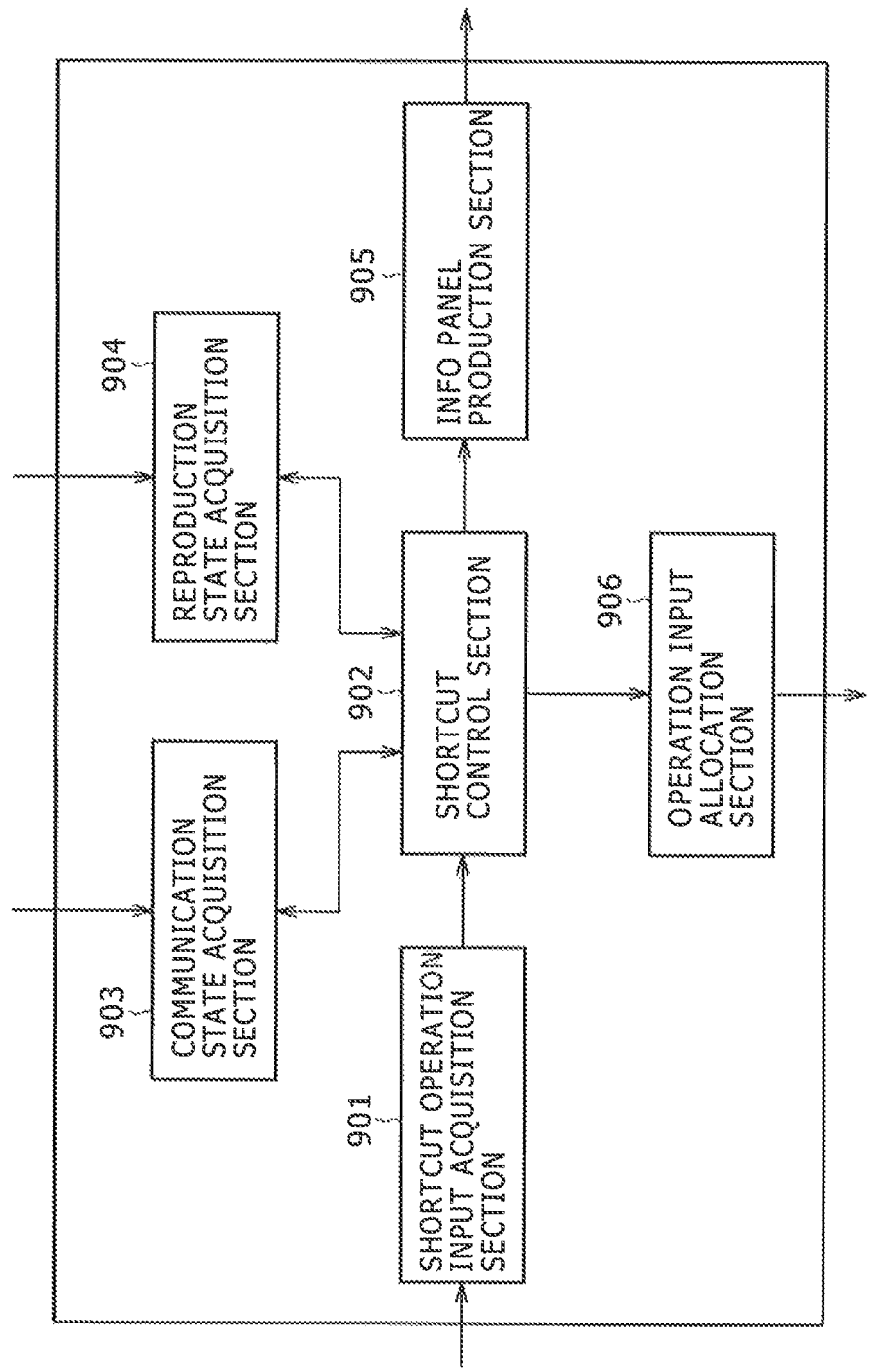
FIG. 28 is a block diagram showing an example of a functional configuration of an application manager of the information communication terminal where the shortcut process is executed.

FIG. 28 shows an example of a functional configuration of the application manager (FIG. 12) of the application processor 131 (FIG. 11) where a process based on an operation of such an INFO button 11 as described hereinabove (such process is hereinafter referred to as shortcut process) is executed A shortcut operation input acquisition section 901 acquires an operation input from the INFO button 11 or the BACK button 24 accepted by the inputting module 150 when a function which makes an object of a shortcut (in the example of FIG. 27, the communication function and the reproduction function) is being executed as a shortcut operation. Then, the shortcut operation input acquisition section 901 supplies a result of the acquisition to a shortcut control section 902.

The shortcut control section 902 controls the associated components in response to the substance of the shortcut operation supplied thereto from the shortcut operation input acquisition section 901, that is, in the example of FIG. 27, in response to whether the INFO button 11 or the BACK button 24 is operated.

A communication state acquisition section 903 acquires the communication state of the communication function being currently executed, that is, the communication state, for example, upon starting of the communication application, music streaming or instant messenger, and supplies the acquired communication state to the shortcut control section 902 under the control of the shortcut control section 902.

A reproduction state acquisition section 904 acquires the reproduction state of the reproduction function being currently executed, for example, the reproduction function upon starting, for example, of the audio player or the music streaming, and supplies the acquired reproduction state to the shortcut control section 902 under the control of the shortcut control section 902.

An INFO panel production section 905 produces an INFO panel 801 in response to the shortcut operation, the communication state or the reproduction state under the control of the shortcut control section 902 and supplies the produced INFO panel 801 to the display module 142.

An operation input allocation section 906 allocates an input from a predetermined inputting device such as the four-direction key 26 to the communication function or the reproduction function or cancel such allocation in response to a shortcut operation under the control of the shortcut control section 902.

Now, particular examples of the shortcut process in the example of FIG. 27 is described with reference to FIGS. 29A to 38B.

First, a particular example of shortcutting to the communication function by the instant messenger where both of the audio player and the instant messenger in the infrastructure mode of the WLAN are operating and the communication function by the instant messenger and the reproduction function by the audio player are being executed simultaneously is described (arrow mark A in FIG. 27).

When the communication state in the communication function by the instant messenger is such that, for example, an event occurs with the communication tool in which the information communication terminal 1 is logged, if the INFO button 11 is depressed, then the IM communication INFO panel 801-1A is displayed. In this instance, as seen in FIG. 29A, the IM communication INFO panel 801-1A includes electronic mail information 811 representative of the number of unread electronic mails for each electronic mail service, and event information 812 relating to each unprocessed event (for example, chatting) such as an icon representative of the communication tool, an icon representative of the substance of the event, the ID of the communication opposite party, the time of occurrence of the event and so forth.

Figures 29A, 29B, 29C:
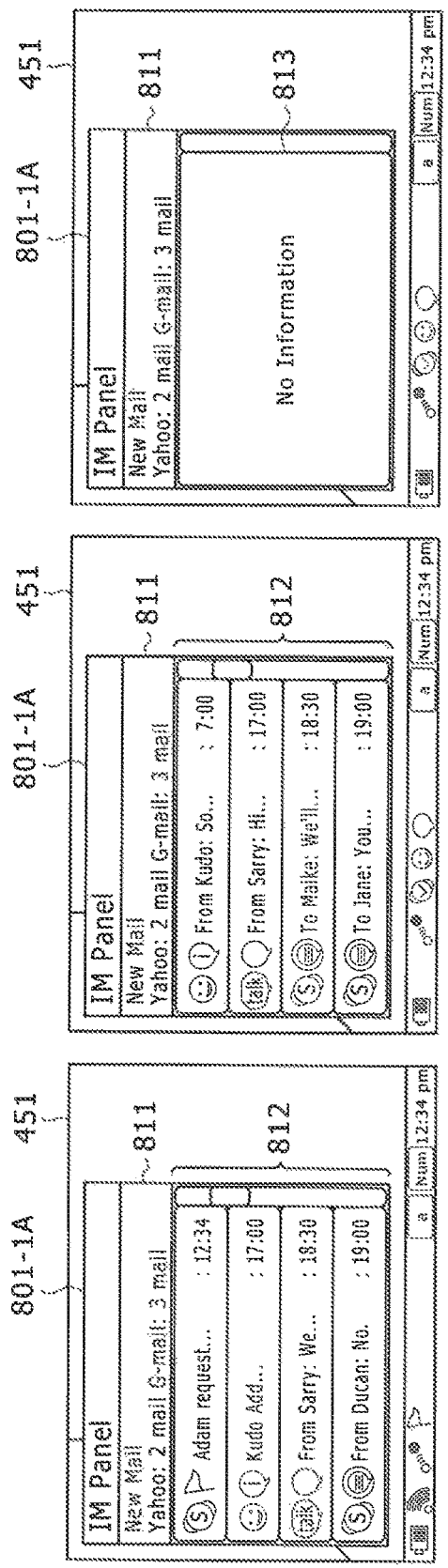
FIGS. 29A to 29C are schematic views showing examples of display of a communication INFO panel of the information communication terminal.

In the example described, for the information relating to the newly occurring event in the event information 812, which is, in the example of FIG. 29A, information at the highest stage of the event information 812, an icon of a flag mark representing that the event is an event having newly occurred is displayed.

Figure 30:
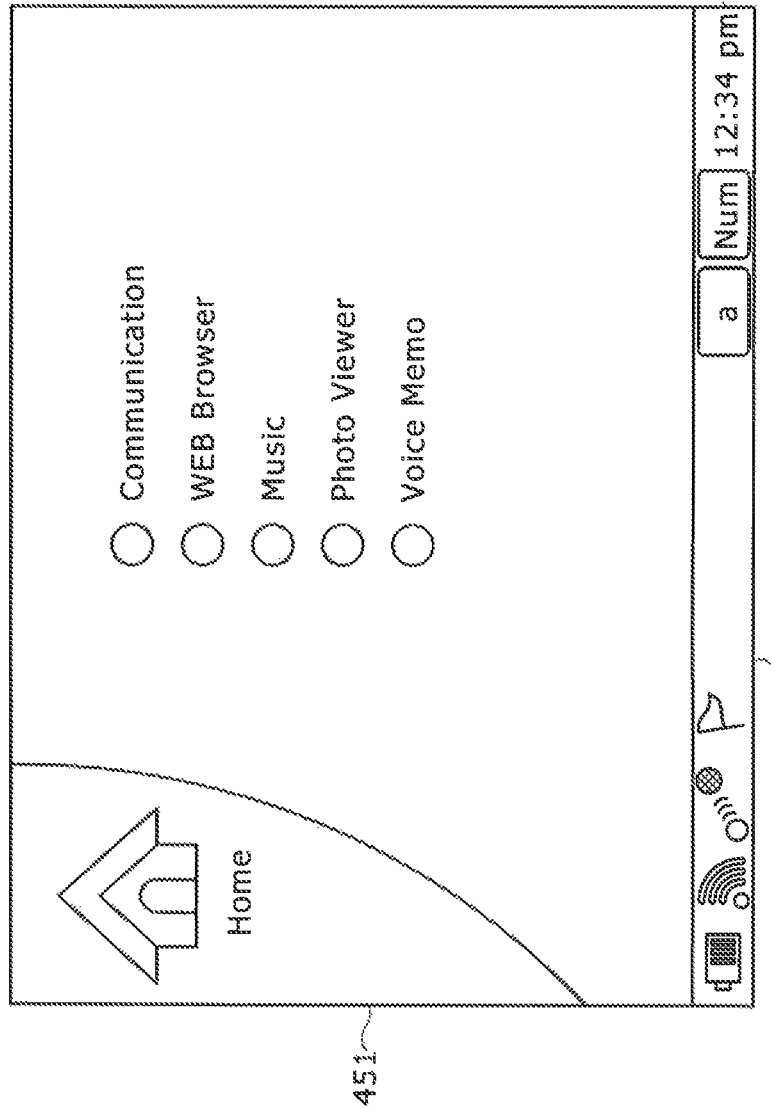
FIG. 30 is a schematic view showing another example of display of the HOME screen.

It is to be noted that, if an event occurs, then since an icon of a flag mark representing that an event has occurred is displayed in the communication utilizing application state display area 204 of the normal display panel 101 as seen in FIG. 30, if the user depresses the INFO button 11 when the icon is displayed on the normal display panel 101, then the IM communication INFO panel 801-1A shown in FIG. 29A can be displayed. Therefore, the user can confirm the event having occurred newly.

On the other hand, if the INFO button 11 is depressed in a communication state wherein no new event occurs, that is, when an icon of the flag mark is not displayed on the normal display panel 101, then if an unprocessed even exists, then event information 812 relating the unprocessed event is displayed as seen in FIG. 29B. However, if no unprocessed event exists, then a message 13 representing that no event exists is displayed as seen in FIG. 29D.

In this manner, if the INFO button 11 is depressed, then the IM communication INFO panel 801-1A is displayed in accordance with the communication state, and simultaneously, an input from a predetermined inputting device such as the four-direction key 26 is allocated to the communication function by the instant messenger. Thus, the instant messenger is controlled, for example, in response to an input from the four-direction key 26.

Figure 31A:
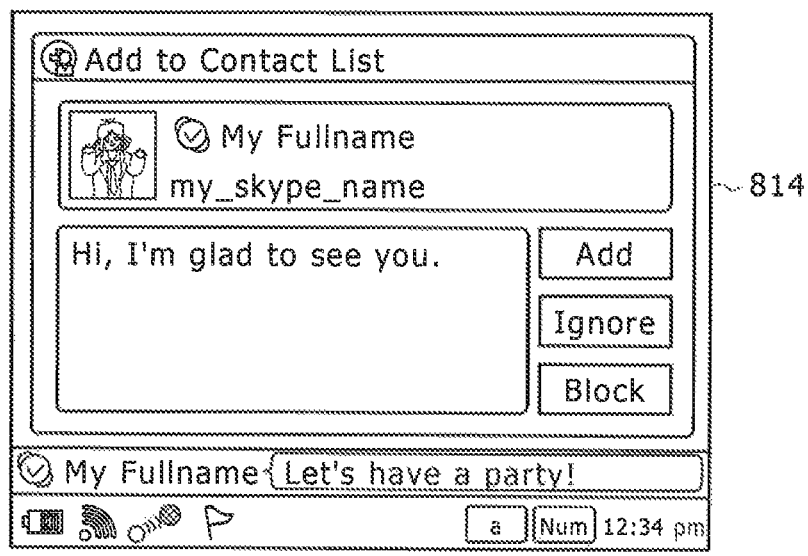
FIGS. 31A and 31B are schematic views showing examples of utilization of the communication INFO panel.
Figure 31B:
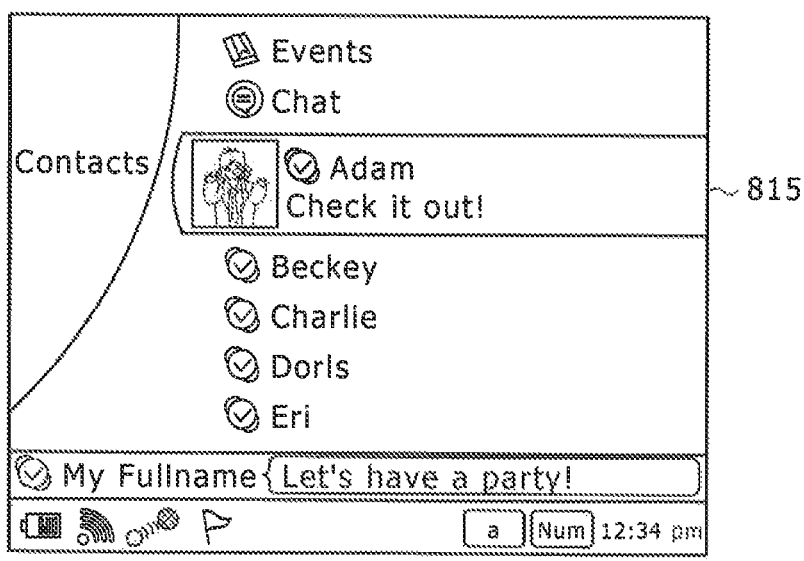

For example, by operating the four-direction key 26, information relating to an event at the highest stage of the event information 812 of FIG. 29A can be selected and determined. Thus, such a GUI 814 as shown in FIG. 31A is displayed. Then, if a responding message is inputted to the GUI 814 and the input is settled, then the event can be processed. After the process, a contact list 815 of the communication tool is displayed as seen in FIG. 31B.

In this manner, shortcutting to the communication function by the infrastructure mode can be carried out by operating the INFO button 11.

Now, a particular example of shortcutting to the communication function in the ad hoc mode where, for example, the music streaming in the ad hoc mode of the WLAN is operating and the communication function and the reproduction function in the ad hoc mode are being executed simultaneously is described (arrow mark C in FIG. 27).

Figure 32A:
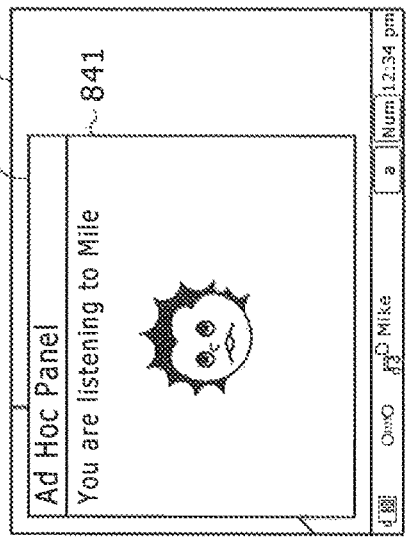
FIGS. 32A to 32E are schematic views showing different examples of display of the communication INFO panel.

When the communication state of the communication function in the ad hoc mode is a state wherein an event of reception of a registration request occurs, if the INFO button 11 is depressed, then the ad hoc mode communication INFO panel 801-1B including a message 821 representing that a registration request is received and a button 822 for accessing the event is displayed as seen in FIG. 32A.

It is to be noted that, when an event occurs, since an icon representing occurrence of an event in ad hoc mode communication is displayed in the communication utilizing application state display area 204 of the normal display panel 101 as seen in FIG. 33, if the user depresses the INFO button 11 when the icon is displayed on the normal display panel 101, then the user can confirm information according to the event which has occurred.

Figure 32B:
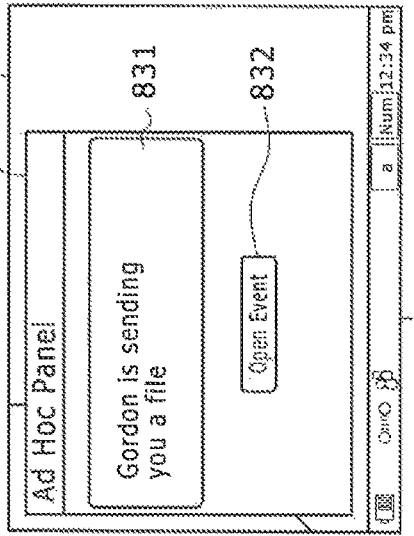
Figure 32C:
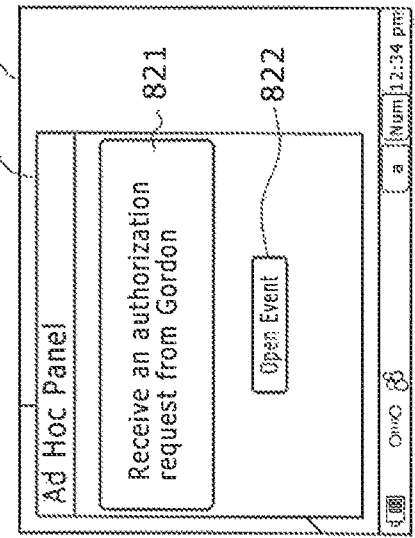
Figure 32D:
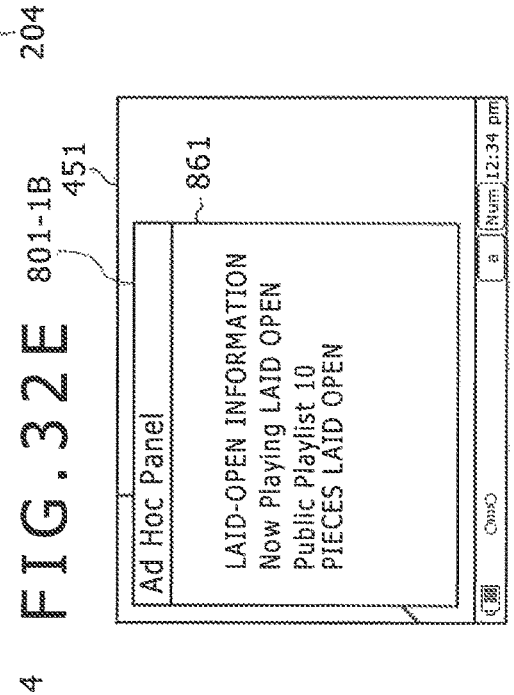

On the other hand, when the communication state is such that an event of transfer of a file from another information communication terminal 1 occurs, if the INFO button 11 is depressed, then the ad hoc mode communication INFO panel 801-1B including a message 831 representing that file transfer is proceeding and a button 832 for accessing the event is displayed as seen in FIG. 32B.

Further, when the communication state is such that an event of streaming reproduction of a piece of music from another information communication terminal 1 occurs, if the INFO button 11 is depressed, then the ad hoc mode communication INFO panel 801-1B including streaming information 841 indicating such streaming reproduction is displayed as seen in FIG. 32O. It is to be noted that the streaming information 841 includes display of a face icon (FIG. 23) registered as registration information of the information communication terminal 1 of the streaming source.

Meanwhile, when the communication state is such that an event that a piece of music provided by the user of the information communication terminal 1 is streaming reproduced by another information communication terminal 1, if the INFO button 11 is depressed, then the ad hoc mode communication INFO panel 801-1B including streaming information 851 indicating such streaming reproduction is displayed as seen in FIG. 32O. It is to be noted that the streaming information 851 includes display of a face icon registered as registration of the information communication terminal 1 of the streaming source, that is, the registration information of the user of the information communication terminal 1.

Figure 32E:
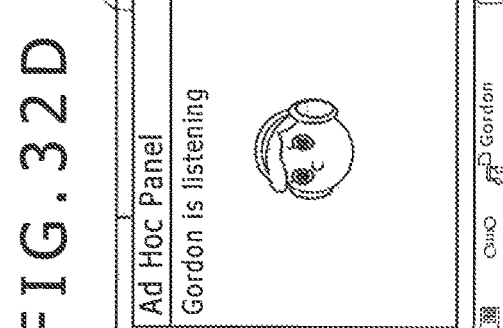

Further, if the INFO button 11 is depressed in such a communication state that no event occurs, then the ad hoc mode communication INFO panel 801-1B including standby information 861 is displayed as seen in FIG. 32E. In the example shown, the standby information 861 includes information laid open in the ad hoc mode.

In this manner, when the INFO button 11 is depressed, the ad hoc mode communication INFO panel 801-1B according to the communication state is displayed. Simultaneously, an input from a predetermined inputting device such as the four-direction key 26 is allocated to the communication function by the ad hoc mode. Thus, communication according to the ad hoc mode is controlled in response to the input, for example, from the four-direction key 26.

For example, if the button 822 of FIG. 32A is operated, then a GUI 823 for registering the opposite party from which a registration request is received, is displayed as seen in FIG. 34. Consequently, a registration process can be performed utilizing the GUI 823.

In this manner, shortcutting to the communication function by the ad hoc mode can be performed by operating the INFO button 11.

Now, a particular example of shortcutting to the reproduction function is described (arrow marks B, D and F in FIG. 27).

In the present example, if the INFO button 11 is depressed after the INFO panel 801 is displayed and an operation input from a predetermined inputting device is allocated to the communication function to perform shortcutting to the communication function, then such a reproduction INFO panel 801-2 as shown, for example, in FIG. 35 is displayed.

The reproduction INFO panel 801-2 includes information according to the reproduction state such as, for example, the title name, artist name, album name and thumbnail image of the jacket of the album or the like. It is to be noted that this information is basically similar to that displayed on the music data reproduction display screen 515 illustrated in FIG. 20.

It is to be noted that, although the reproduction INFO panel 801-2 is displayed in response to an operation of the INFO button 11 also when the reproduction function is not being performed, in this instance, the substance of the reproduction INFO panel 801-2 is displayed as the blank as seen in FIG. 36.

Further, irrespective of whether the piece of music being reproduced is a locally stored one such as that stored in the large capacity flash memory 154 of FIG. 11 or is a piece of music under streaming, a basically similar reproduction INFO panel 801-2 is displayed. However, also it is possible to display a reproduction INFO panel 801-2 indicating whether the piece of music being reproduced is a locally stored one or one under streaming from another information communication terminal 1.

Figure 37A:
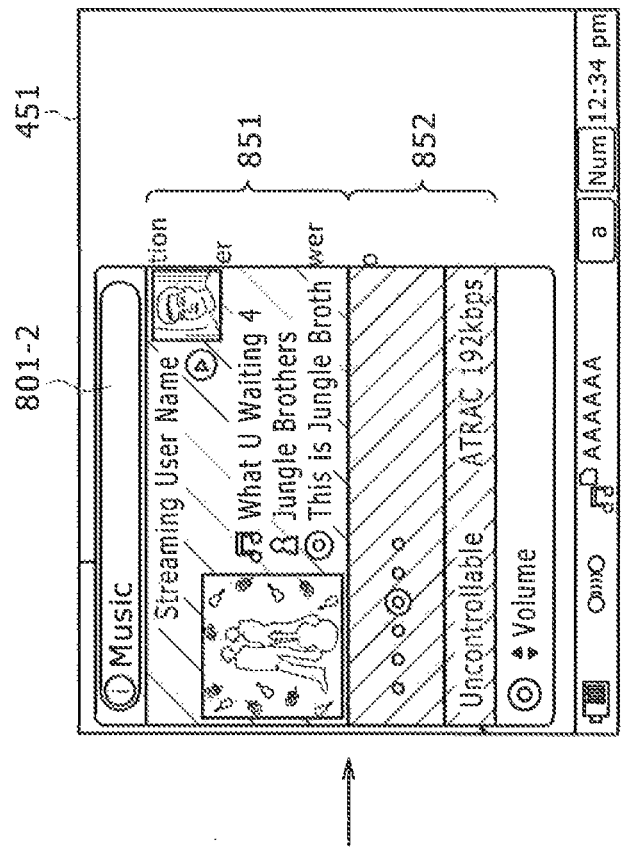
Figure 37B:
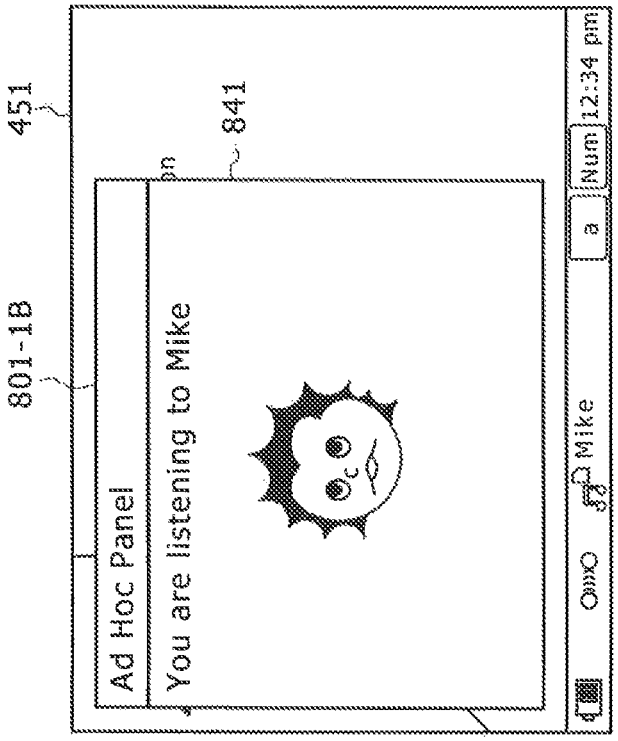

For example, if the INFO button 11 is depressed in a state illustrated in FIG. 37A wherein the ad hoc mode communication INFO panel 801-1B (ad hoc mode communication. INFO panel 801-1B same as that shown in FIG. 82C) including streaming information 841 representing that a piece of music provided from, another information communication terminal 1 is being streaming reproduced is displayed, then it is determined that the reproduction state is streaming reproduction. Thus, it is possible to display the reproduction INFO panel 801-2 wherein the upper half region 851 of the reproduction INFO panel 801-2 has a color represented by user color information to IG. 23) registered as registration information of the information communication terminal 1 of the streaming source. It is to be noted that, in the present example, the other region 852 is displayed in a color represented by the user color information (FIG. 23) of the self apparatus as seen from FIG. 370.

On the other hand, where a locally stored piece of music is being reproduced, it is determined that the reproduction state is that a locally stored piece of music is being reproduced, and the reproduction INFO panel 301-2 may be displayed such that it is colored in a color represented by the user color information (FIG. 23) recorded as the registration information of the self apparatus.

Figure 38A:
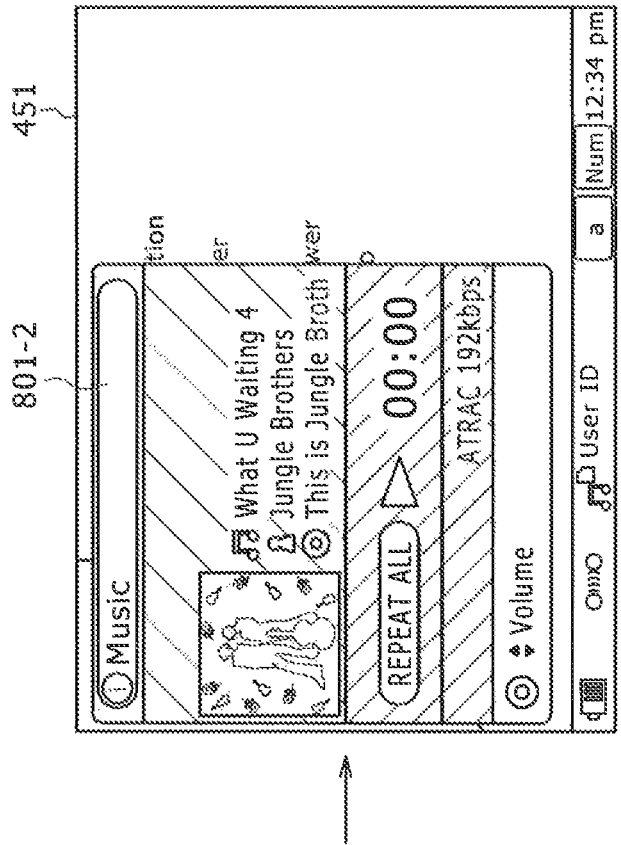
Figure 38B:
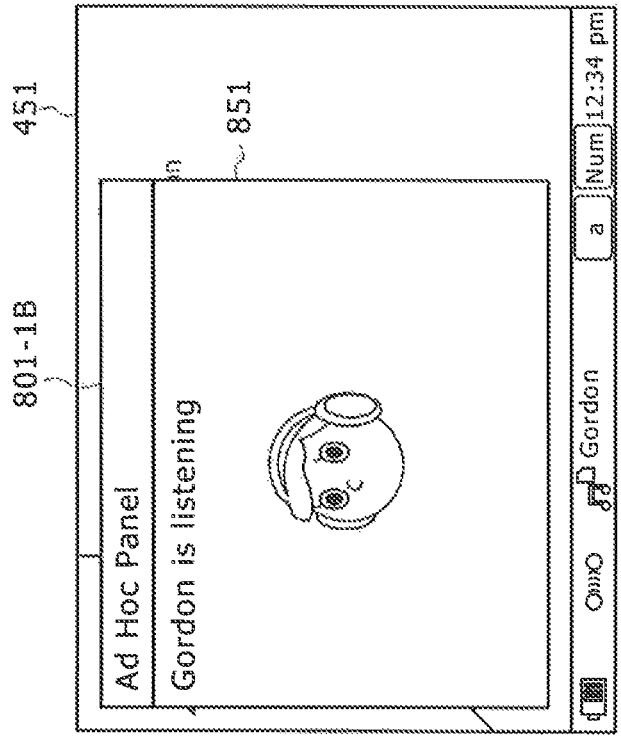

It is to be noted that, if the INFO button 11 is depressed when a piece of music has been provided for streaming reproduction to another information communication terminal 1, that is, when the ad hoc mode communication INFO panel 801-1B shown in FIG. 38A (same as the ad hoc mode communication INFO panel 801-1B shown in FIG. 320) including the streaming information 851 representing that a piece of music provided from the self apparatus is being streaming reproduced, the reproduction INFO panel 801-2 representing reproduction information of the streaming object as seen in FIG. 380 may be displayed although the reproduction information is not information relating to reproduction of the self apparatus.

When the INFO button 11 is depressed, although the reproduction INFO panel 801-2 corresponding to the reproduction state is displayed in this manner, an input from a predetermined inputting device such as the four-direction key 26 is allocated to the reproduction function simultaneously. Consequently, the reproduction process is controlled in response to an input, for example, from the four-direction key 26.

In this manner, shortcutting to the reproduction function can be performed by operating the INFO button 11.

Now, operation of the application manager (FIG. 28) where a shortcut process is executed is described with reference to FIG. 39. It is to be noted that the shortcut process is executed when a plurality of predetermined functions are being executed simultaneously, and in the example of FIG. 39, it is assumed that the wireless communication function and the reproduction function are being executed simultaneously.

At step S1, the shortcut operation input acquisition section 901 waits until an operation input to the INFO button 11 is accepted by the inputting module 150, that is, until the INFO button 11 is depressed. Then, when the INFO button 11 is depressed, a notification of this is issued to the shortcut control section 902. Thereafter, the processing advances to step S2.

At step S2, the shortcut control section 902 decides whether or not the wireless communication function of the information communication terminal 1 is valid. If the shortcut control section 902 decides that the wireless communication function is valid, then it advances the processing to step S3.

In particular, the shortcut control section 902 decides whether or not, for example, a turning on operation of the WLAN ON/OFF switch 30 is accepted by the inputting module 150. Then, if it decides that a turning on operation is accepted, then it advances the processing to step S3.

At step S3, the shortcut control section 902 decides whether or not the WLAN application is in the infrastructure mode or the ad hoc mode. Then at step S4, the shortcut control section 902 acquires the communication state in the detected mode.

In particular, the communication state acquisition section 903 detects an application which is currently operating and implements the wireless communication function (for example, the communication application, streaming application or instant messenger). Then, the communication state acquisition section 903 accesses the detected application to acquire the communication state (for example, that a predetermined event occurs) of the communication function being executed and supplies the acquired communication state to the shortcut control section 902.

The shortcut control section 902 supplies die communication state of the communication function being executed which has been supplied from the communication state acquisition section 903 to the INFO panel production section 905.

At step S5, the INFO panel production section 905 produces a communication INFO panel 801-1 based on the communication state of the currently executed communication function supplied from the shortcut control section 902, and supplies the produced communication INFO panel 601-1 to the display module 142. Consequently, the display module 142 causes the display section 21 to display the communication INFO panel 801-1 supplied from the INFO panel production section 905 (arrow marks A, C and E in FIG. 27).

At step S6, the shortcut control section 902 controls the operation input allocation section 906 to allocate an operation input from a predetermined inputting device accepted by the inputting module 150 to the communication function being currently executed. In other words, the operation input accepted by the inputting module 150 is supplied to the application by which the function is being executed. It is to be noted that, where the communication function is executed already and an operation input from a predetermined inputting device is allocated to the communication function, the operation input from the predetermined inputting device is allocated to the communication function.

Where the operation input is supplied to the application by which the communication function is implemented in this manner, the user can utilize the communication function being currently executed by operating the inputting device.

Then at step S7, the shortcut operation input acquisition section 901 decides whether or not an operation input to the BACK button 24 is accepted by the inputting module 150, that is, whether or not the BACK button 24 is operated. If the shortcut operation input acquisition section 901 decides that the BACK button 24 is not operated, then it advances the processing to step S8, at which it further decides whether or not the INFO button 11 is depressed.

If it is decided at step S8 that the INFO button 11 is not depressed, then the processing returns to step S7 so that the processes at the steps beginning with step S7 are performed similarly.

If it is decided at step S2 that the wireless communication function of the information communication terminal 1 is not valid, or if it is decided at step S8 that the INFO button 11 is depressed, then the processing advances to step S9. At step S9, the shortcut control section 902 acquires the reproduction state of the reproduction function being currently reproduced.

In particular, the reproduction state acquisition section 904 detects the application which is currently operating and implements the reproduction function such as, for example, the streaming function or audio player. Further, the reproduction state acquisition section 904 accesses the detected application to acquire the reproduction state (for example, the name of the piece of music being currently reproduced, that a locally stored piece of music is being reproduced or that streaming reproduction is proceeding). Then, the reproduction state acquisition section 904 supplies the reproduction state to the shortcut control section 902.

The shortcut control section 902 issues a notification of the reproduction state of the currently executed reproduction function supplied from the reproduction state acquisition section 904 to the INFO panel production section 905.

At step S10, the INFO panel production section 905 produces a reproduction INFO panel 801-2 suitable for the reproduction state of the currently executed reproduction function supplied from the shortcut control section 902, and supplies the produced reproduction INFO panel 801-2 to the display module 142. Consequently, the display module 142 controls the display section 21 to display the reproduction INFO panel 801-2 supplied from the INFO panel production section 905 (arrow marks B and P in FIG. 27). It is to be noted that a display process of the INFO panel 801-1C in the example of FIG. 27 is omitted herein.

At step S11, the shortcut control section 902 controls the operation input allocation section 906 to allocate an operation input from a predetermined inputting device accepted by the inputting module 150 to the reproduction function being currently reproduced. Thus, the operation input accepted by the inputting module 150 is supplied to the application by which the reproduction function is executed.

Where the operation input is supplied to the application which implements the reproduction function in this manner, the user can utilize the reproduction function by operating an inputting device.

At step S12, the shortcut operation input acquisition section 901 decides whether or not the INFO button 11 or the BACK button 24 operated, and waits until the INFO button 11 or the BACK button 24 is operated.

When it is decided at step S7 that the BACK button 24 is operated or if it is decided at step 912 that the INFO button 11 or the BACK button 24 is operated, then the processing advances to step S13. At step S13, the shortcut control section 902 controls the display module 142 through the INFO panel production section 905 to erase the INFO panel 801 displayed at step S5 or S10. Consequently, the non-displaying state of the INFO panel 801, restored (arrow marks H, I and J or an arrow mark G in FIG. 27).

The shortcut control section 902 further controls the operation input allocation section 906 to cancel the allocation (step S6 or S11) of the communication function or the reproduction function of the operation input from the inputting device accepted by the inputting module 150. As a result, for example, an operation input is allocated to an operation process on the HOME screen 451. Consequently, the user now can operate the HOME screen 451 by operating an inputting device.

After the non-displaying state of the INFO panel 801 is restored at step S13, the processing returns to step S1 so that the processes at the steps beginning with step S1 are repeated similarly.

The shortcut process is executed in such a manner as described above.

It is to be noted that, while the foregoing description relates to the case wherein the wireless communication function and the reproduction function are executed simultaneously and shortcutting to one of the wireless communication function and the reproduction function is performed, the present invention can be applied similarly also to the other functions.

Now, another example of allocation of an operation input is described.

Figure 40:
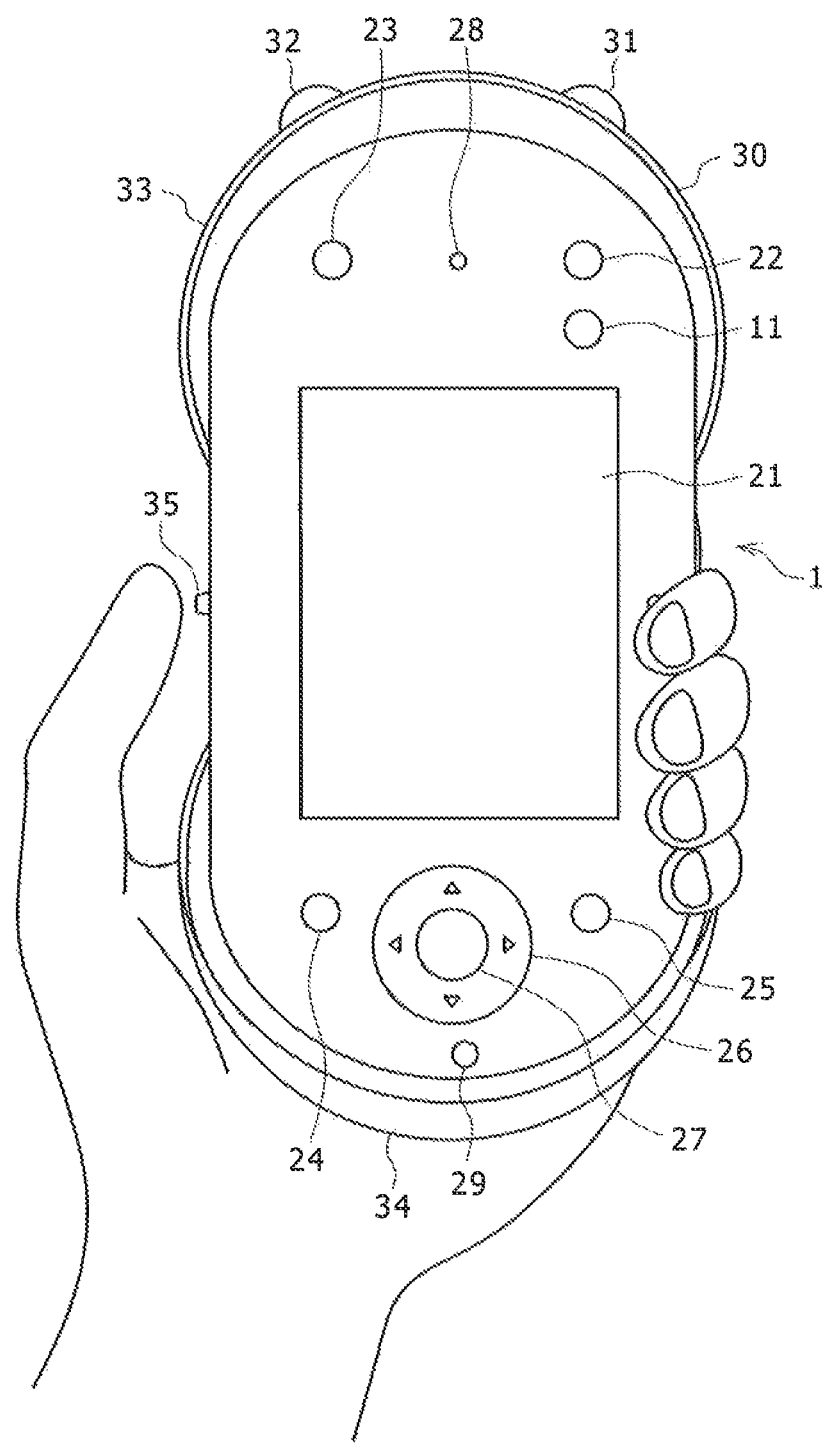
FIG. 40 is a schematic view illustrating an example of a manner in which the user holds and uses the information communication terminal.

The present allocation of an operation input allocates an operation input from the music key 35 to a sound volume adjustment function of an IP telephone where the information communication terminal 1 is utilized as a telephone set, that is, where, for example, the communication application is started to execute the IP telephone function.

Where the user uses the information communication terminal 1 as an IP telephone, the user wound hold the information communication terminal 1 such that the positions of the speaker 28 and the microphone 29 of the information communication terminal 1 correspond to one of the ears and the mouth, respectively, as seen in FIG. 10. In this instance, the fingers of the left hand of the user and the inputting devices of the information communication terminal 1 have such a positional relationship as seen in FIG. 40. Therefore, the music key 35 provided on a longitudinal side face of the body of the information communication terminal 1 is positioned such that it can be operated easily by the thumb of the left hand. On the other hand, where the information communication terminal 1 is held by the right hand, though not shown, the music key 35 is positioned such that it can be operated easily by the forefinger, middle finger or the like of the right hand.

Therefore, where an IP telephone is utilized on the information communication terminal 1, the user can adjust the sound volume of telephone conversation simply by allocating an operation input from the music key 35 to the sound volume adjustment function of an IP telephone.

Although it is possible to separately provide the sound volume adjustment button upon utilization of an IP telephone, for example, where the information communication terminal 1 does not have a space at which such a button is provided newly, if the music key 35 can be utilized also as a sound volume adjustment button, then sound volume adjustment can be performed without providing a button separately. Further, if the music key 35 provided at a position at which it can be operated readily upon utilization of an IP telephone is utilized for the sound volume adjustment, then the sound volume adjustment can be performed simply without re-holding the information communication terminal 1 for sound volume adjustment.

The IP telephone service is a comparatively new service and the infrastructure therefor is not prepared sufficiently as yet. Therefore, the sound volume in telephone conversation varies depending upon the position in which the user utilizes the information communication terminal 1, and it is frequently difficult to catch the voice of telephone conversation. Further, where the apparatus of the opposite part of telephone conversion is a personal computer, the sound volume of telephone conversation may be small depending upon the sound volume setting situation of the personal computer.

In particular, since it is estimated that, upon utilization of an IP telephone, the sound volume adjustment is performed frequently, it is particularly useful to a terminal of an IP telephone to provide the information communication terminal 1 with a function which can readily carry out sound volume adjustment upon utilization of an IP telephone.

Figure 41:
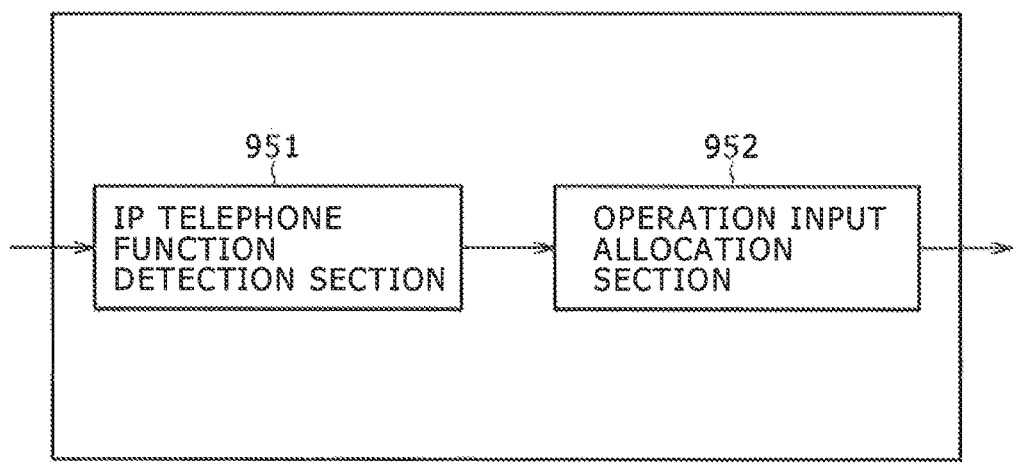
FIG. 41 is a block diagram showing another example of the functional configuration of the application manager.

FIG. 41 shows an example of a functional configuration of the application manager of the application processor 131 where a process of allocating an input from the music key 35 to a sound volume adjustment process of telephone conversation of an IP telephone when the IP telephone function is executed.

Referring to FIG. 41, the application manager shown includes an IP telephone function detection section 951 and an operation input allocation section 952. For example, when the communication application (Communication) 461 of the HOME screen 451 of FIG. 13 is selected and determined to start execution of the IP telephone function, or when execution of the IP telephone function is ended, the IP telephone function detection section 951 issues a notification of this to the operation input allocation section 952.

When the operation input allocation section 952 receives the notification that execution of the IP telephone function is started from the IP telephone function detection section 951, it allocates an input from the music key 35 to the sound volume adjustment function of the IP telephone function.

On the other hand, when the operation input allocation section 952 receives a notification that execution of the IP telephone function is ended from the IP telephone function detection section 951 after it allocates an operation input from the music key 35 to the sound volume adjustment function of the IP telephone function, it cancels the allocation of an input from the music key 35 to the IP telephone function. In other words, a later input from the music key 35 is allocated to that function which was effective before it is allocated to the IP telephone function.

It is to be noted that, while the series of processes described above can be executed by software, it may otherwise be executed by hardware incorporated so as to execute the series of processes. Where the series of processes is executed by software, a program which constructs the software is installed from a recording medium into a computer incorporated in hardware for exclusive use or, for example, a personal computer for universal use which can execute various functions by installing various programs.

The recording medium is formed as a removable medium 172 or the like such as, as shown in FIG. 11, a magnetic disc (including a floppy disc), an optical disc (including a CD-ROM (Compact Disc-Read Only Memory) and a DVD (Digital Versatile Disc)), or a magneto-optical disc (including an MD (Mini Disc) (trademark)), or a semiconductor memory which has the program recorded thereon or therein.

Further, in the present specification, the steps which describe the program recorded in a recording medium may be but need not necessarily be processed in a time series in the order as described, and include processes which are executed in parallel or individually without being processed in a time series.

Further, where the functional blocks shown in FIG. 28 or 41 is formed from hardware, the processes illustrated in FIG. 27 or 39 can be executed by hardware.

Furthermore, in the present specification, the term "system" is used to represent an entire apparatus composed of a plurality of apparatus.

While a preferred embodiment of the present invention has been described using specific terms, such description is for illustrative purpose only, and it is to be understood that changes and variations may be made without departing from the spirit or scope of the following claims.

What is claimed is:

1. A mobile communication apparatus comprising:
a communication unit configured to communicate with a communication partner;
a display unit configured to display a screen;
a selecting unit configured to select, in response to a first user operation, one music piece from a plurality of music pieces of a playlist displayed on the screen;
a reproducing unit configured to reproduce music data corresponding to the selected one music piece, the music data being received by the communication unit; and
a switching unit configured to switch the screen being displayed by the display unit, based on a second user operation,
wherein the switching unit switches the screen from a first screen when reproducing the music data to a second screen that is different from the first screen, based on a single pressing, as the second user operation, of an operable area associated with a button,
wherein the switching unit switches the screen from the first screen when reproducing the music data to a third screen that is different from the first and second screens, based on a double pressing, as the second user operation, of the operable area associated with the button,
wherein one or more communication partners is registered within a storage memory, the display unit displays information of the one or more communication partners, and the display unit is further configured to display music information of a music piece currently reproduced by one of the communication partners, and
wherein the communication unit, the display unit, the selecting unit, the reproducing unit, and the switching unit are each implemented via at least one processor.

2. The mobile communication apparatus according to claim 1, wherein the display unit is further configured to display
one of a title name, an artist name, an album name, or a thumbnail image of the jacket of the selected one of the music pieces while the music data is reproduced.

3. The mobile communication apparatus according to claim 1, wherein the music data is received from the at least one communication partner via the communication unit.

4. The mobile communication apparatus according to claim 1, wherein the second user operation is a pushing of the button by the user.

5. The mobile communication apparatus according to claim 4,
wherein the button is provided on a surface of the mobile communication apparatus adjacent to the display unit.

6. A method performed by a mobile communication apparatus, the method comprising:
communicating with a communication partner;
displaying a screen;
selecting, in response to a first user operation, one music piece from a plurality of music pieces of a playlist displayed on the screen;
reproducing music data corresponding to the selected one music piece, the music data being received from the communication partner; and
switching the screen being displayed, based on a second user operation,
wherein the screen is switched from a first screen when reproducing the music data to a second screen that is different from the first screen, based on a single pressing, as the second user operation, of an operable area associated with a button,
wherein the screen is switched from the first screen when reproducing the music data to a third screen that is different from the first and second screens, based on a double pressing, as the second user operation, of the operable area associated with the button, and wherein one or more communication partners is registered within a storage memory, information of the one or more communication partners is displayed, and music information of a music piece currently reproduced by one of the communication partners is further displayed.

7. The method according to claim 6 further comprising: displaying one of a title name, an artist name, an album name, or a thumbnail image of the jacket of the selected one of the music pieces while reproducing the music data.

8. The method according to claim 6 further comprising: registering one or more communication partners; and displaying information of the one or more communication partners.

9. The method according to claim 8 further comprising: displaying music information of a music piece currently reproduced by one of the communication partners.

10. A non-transitory computer-readable medium storing instructions which, when executed by a mobile communication apparatus, cause the communication apparatus to execute a method, the method comprising:
communicating with a communication partner;
displaying a screen;
selecting, in response to a first user operation, one music piece from a plurality of music pieces of a playlist displayed on the screen;
reproducing music data corresponding to the selected one music piece, the music data being received from the communication partner; and
switching the screen being displayed, based on a second user operation,
wherein the screen is switched from a first screen when reproducing the music data to a second screen that is different from the first screen, based on a single pressing, as the second user operation, of an operable area associated with a button,
wherein the screen is switched from the first screen when reproducing the music data to a third screen that is different from the first and second screens, based on a double pressing, as the second user operation, of the operable area associated with the button, and
wherein one or more communication partners is registered within a storage memory, information of the one or more communication partners is displayed, and music information of a music piece currently reproduced by one of the communication partners is further displayed.

11. A communication apparatus comprising a communication device, a display device, and a processing device, the processing device executing instructions for control of:
maintaining a playlist of music pieces;
broadcasting the playlist;
permitting the broadcasted playlist to be opened by a communication partner registered with the communication apparatus to communicate with the communication apparatus;
receiving a designation of one of the music pieces on the playlist;
collecting music data corresponding to the designation of one of the music pieces on the playlist; and
transmitting the collected music data via the communication device,
wherein the processing device is configured to switch a screen, being displayed by the display device, from a first screen to a second screen that is different from the first screen, based on a single pressing of an operable area associated with a button, and
wherein the processing device is further configured to switch the screen from the first screen to a third screen that is different from the first and second screens, based on a double pressing of the operable area associated with the button.

12. The communication apparatus according to claim 11, wherein
the designation of one of the music pieces of the playlist is received from a communication partner registered with the communication apparatus to communicate with the communication apparatus.

13. A method performed by a communication apparatus comprising a communication device, a display device, and a processing device, the method comprising the steps of:
maintaining a playlist of music pieces;
broadcasting, by the communication device, the playlist;
permitting the broadcasted playlist to be opened by a communication partner registered with the communication apparatus to communicate with the communication apparatus;
receiving a designation of one of the music pieces on the playlist;
collecting, by the processing device, music data corresponding to the designation of one of the music pieces on the playlist; and
transmitting, by the communication device, the collected music data via the communication device,
wherein the processing device is configured to switch a screen, being displayed by the display device, from a first screen to a second screen that is different from the first screen, based on a single pressing of an operable area associated with a button, and
wherein the processing device is further configured to switch the screen from the first screen to a third screen that is different from the first and second screens, based on a double pressing of the operable area associated with the button.

14. The method according to claim 13, wherein
the designation of one of the music pieces of the playlist is received from a communication partner registered with the information processing apparatus to communicate with the information processing apparatus.

15. A non-transitory computer-readable medium storing instructions which, when executed by a communication apparatus having a processing device and a display device, cause the communication apparatus to execute a method, the method comprising:
maintaining a playlist of music pieces;
broadcasting the playlist;
permitting the broadcasted playlist to be opened by a communication partner registered with the communication apparatus to communicate with the communication apparatus;
receiving a designation of one of the music pieces on the playlist;
collecting music data corresponding to the designation of one of the music pieces on the playlist; and
transmitting the collected music data via the communication device,
wherein the processing device is configured to switch a screen, being displayed by the display device, from a first screen to a second screen that is different from the first screen, based on a single pressing of an operable area associated with a button, and wherein the processing device is further configured to switch the screen from the first screen to a third screen that is different from the first and second screens, based on a double pressing of the operable area associated with the button.

* * * * *